US012774389B2

(12) United States Patent
Ono et al.

(10) Patent No.: US 12,774,389 B2
(45) Date of Patent: Oct. 27, 2026

(54) HIGHLY HEAT-RESISTANT RESIN COMPOSITE INCLUDING CHEMICALLY MODIFIED, FINE CELLULOSE FIBERS

(71) Applicant: Asahi Kasei Kabushiki Kaisha, Tokyo (JP)

(72) Inventors: Hirofumi Ono, Tokyo (JP); Kazufumi Kawahara, Tokyo (JP); Ryosuke Ozawa, Tokyo (JP); Masahiro Ohga, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 98 days.

(21) Appl. No.: 18/672,123

(22) Filed: May 23, 2024

(65) Prior Publication Data

US 2024/0309208 A1 Sep. 19, 2024

Related U.S. Application Data

(63) Continuation of application No. 17/059,599, filed as application No. PCT/JP2019/021845 on May 31, 2019, now abandoned.

(30) Foreign Application Priority Data

Jun. 1, 2018 (JP) ................................ 2018-106456

(51) Int. Cl.

| | |
|---|---|
| ***C08L 77/06*** | (2006.01) |
| ***C08B 3/06*** | (2006.01) |
| ***C08B 3/20*** | (2006.01) |
| ***C08J 5/06*** | (2006.01) |
| ***C08L 1/08*** | (2006.01) |
| ***C08L 1/10*** | (2006.01) |
| ***D21H 11/18*** | (2006.01) |
| ***D21H 11/20*** | (2006.01) |

(52) U.S. Cl.

CPC ................ *C08L 77/06* (2013.01); *C08B 3/06* (2013.01); *C08B 3/20* (2013.01); *C08J 5/06* (2013.01); *C08L 1/08* (2013.01); *C08L 1/10* (2013.01); *D21H 11/18* (2013.01); *D21H 11/20* (2013.01); *C08J 2377/06* (2013.01); *C08J 2401/10* (2013.01)

(58) Field of Classification Search

CPC ... C08L 77/06; C08L 1/08; C08L 1/10; C08B 3/06; C08B 3/20; C08J 5/06; C08J 2377/06; C08J 2401/10; D21H 11/20; D21H 11/18

See application file for complete search history.

(56) References Cited

U.S. PATENT DOCUMENTS

| | | | | |
|---|---|---|---|---|
| 2009/0264036 | A1 | 10/2009 | Yano et al. | |
| 2010/0272980 | A1 * | 10/2010 | Kowata .................. | C08B 11/02 428/220 |
| 2013/0025920 | A1 | 1/2013 | Shimizu et al. | |
| 2014/0073722 | A1 | 3/2014 | Shiramizu et al. | |
| 2014/0073776 | A1 | 3/2014 | Shiramizu et al. | |
| 2014/0171521 | A1 | 6/2014 | Enatsu et al. | |
| 2015/0225550 | A1 | 8/2015 | Banzashi et al. | |
| 2015/0292145 | A1 | 10/2015 | Sonoda et al. | |
| 2016/0177512 | A1 | 6/2016 | Kawahara et al. | |
| 2018/0312609 | A1 | 11/2018 | Lin et al. | |
| 2018/0327932 | A1 | 11/2018 | Takegami et al. | |
| 2019/0023859 | A1 | 1/2019 | Yoshida et al. | |
| 2019/0040213 | A1 | 2/2019 | Tsutsumi et al. | |
| 2019/0093285 | A1 | 3/2019 | Lin et al. | |

FOREIGN PATENT DOCUMENTS

| | | | |
|---|---|---|---|
| CN | 101535567 | A | 9/2009 |
| CN | 102834448 | A | 12/2012 |
| CN | 105431587 | A | 3/2016 |
| CN | 106174445 | A | 12/2016 |
| CN | 107074981 | A | 8/2017 |
| JP | 2010-104768 | A | 5/2010 |
| JP | 2011-016995 | A | 1/2011 |
| JP | 2011-213754 | A | 10/2011 |
| JP | 2013-043984 | A | 3/2013 |
| JP | 2013-044076 | A | 3/2013 |

(Continued)

OTHER PUBLICATIONS

Annals of the High Performance Paper Society, Japan, vol. 46, pp. 3-12 (Nov. 2, 2007) (see partial English translation).

Research report , Kyoto Municipal Institute Of Industrial Technology And Culture, No. 8, pp. 37-42 (Sep. 27, 2018) (see partial English translation).

Hiraoki et al., "Molecular Mass and Molecular-Mass Distribution of TEMPO-Oxidized Celluloses and TEMPO-Oxidized Cellulose Nanofibrils," Biomacromolecule, 16 (2): 675-681 (2015).

Dissertation, Kurihara Takanori, (Mar. 24, 2015).

The Journal of the Society of Chemical Industry, Japan, vol. 65, Issue 8, pp. 1310-1312 (Aug. 5, 1962) (see partial English translation).

(Continued)

*Primary Examiner* — Patrick D Niland

(74) *Attorney, Agent, or Firm* — Morgan, Lewis & Bockius LLP

(57) ABSTRACT

Provided is a resin composite having high mechanical properties which make the resin composite moldable into and usable as members for use in applications such as vehicle-mounted members and electrical materials. The resin composite comprises 0.5-40 mass % chemically modified, fine cellulose fibers and a resin, wherein the chemically modified, fine cellulose fibers have a pyrolysis initiation temperature ($T_D$) of 270° C. or higher, a number-average fiber diameter of 10 nm or larger but less than 1 μm, and a degree of crystallinity of 60% or higher. In a preferred embodiment, the chemically modified, fine cellulose fibers have a coefficient of variation (CV) in DS unevenness ratio, DSs/DSt, of 50% or less, the DS unevenness ratio being the ratio of the modification degree (DSs) of the surface layers of the fibers to the modification degree (DSt) of the whole of the fibers.

17 Claims, 4 Drawing Sheets

(56) References Cited

FOREIGN PATENT DOCUMENTS

| | | | |
|---|---|---|---|
| JP | 2014-001361 | A | 1/2014 |
| JP | 2014-009276 | A | 1/2014 |
| JP | 2014-101604 | A | 6/2014 |
| JP | 2014-180777 | A | 9/2014 |
| JP | 2014-208721 | A | 11/2014 |
| JP | 2016-079369 | A | 5/2016 |
| JP | 2016-087966 | A | 5/2016 |
| JP | 2016-089077 | A | 5/2016 |
| JP | 2017-052940 | A | 3/2017 |
| JP | 2017-095831 | A | 6/2017 |
| JP | 2017-155135 | A | 9/2017 |
| JP | 2019-006875 | A | 1/2019 |
| JP | 2019-065454 | A | 4/2019 |
| WO | 2016/010016 | A1 | 1/2016 |
| WO | 2016/049567 | A1 | 3/2016 |
| WO | 2016/148233 | A1 | 9/2016 |
| WO | 2017/073700 | A1 | 5/2017 |
| WO | 2017/131035 | A1 | 8/2017 |
| WO | 2017/135413 | A1 | 8/2017 |
| WO | 2017/159823 | A1 | 9/2017 |

OTHER PUBLICATIONS

The bulletin of the Faculty of Bioresources, Mie University, vol. 14, pp. 143-149 (Mar. 25, 1995) (see partial English translation).

Wood research; Bulletin of the Wood Research Institute, Kyoto University, vol. 21, pp. 1-11 (Mar. 1, 1959).

International Search Report issued in corresponding International Patent Application No. PCT/JP2019/021845 dated Aug. 13, 2019.

International Preliminary Report on Patentability and Written Opinion issued in corresponding International Patent Application No. PCT/JP2019/021845 dated Dec. 1, 2020.

Lignin Adhesive Chemistry (Oct. 31, 2018) (see Figs. 2-6 and 2-7 indicating English axis labels).

Supplementary European Search Report issued in corresponding European Patent Application No. 19810344.2 dated Jul. 9, 2021.

Lee et al., "Surface functionalisation of bacterial cellulose as the route to produce green polylactide nanocomposites with improved properties," Composites Science and Technology, 69 (15-16): 2724-2733 (2009).

* cited by examiner (A)

(B)

HIGHLY HEAT-RESISTANT RESIN COMPOSITE INCLUDING CHEMICALLY MODIFIED, FINE CELLULOSE FIBERS

FIELD

The present invention relates to a resin composite containing chemically modified fine cellulose fibers and having a high thermal decomposition initiation temperature.

BACKGROUND

Resins are light and have excellent processing characteristics, and are therefore widely used for a variety of purposes including automobile members, electrical and electronic parts, business machine housings, precision parts and the like. With resins alone, however, the mechanical properties and dimensional stability are often inadequate, and therefore it is common to use composites of resins with different types of inorganic materials.

Resin compositions comprising resins reinforced with reinforcing materials consisting of inorganic fillers such as glass fibers, carbon fibers, talc or clay have high specific gravity, and the obtained molded resins thus have higher weight.

In recent years, cellulose nanofibers (CNF) have come into use as new reinforcing materials for resins.

In terms of simple properties, fine cellulose fibers are known to have a high elastic modulus similar to aramid fibers, and a lower linear expansion coefficient than glass fibers. In addition, they exhibit a low true density of 1.56 $g/cm^3$, which is overwhelmingly lighter than glass (density: 2.4 to 2.6 $g/cm^3$) or talc (density: 2.7 $g/cm^3$) which are used as common reinforcing materials for thermoplastic resins.

Fine cellulose fibers are obtained from a variety of sources, including those obtained from trees as starting materials, as well as from hemp, cotton, kenaf and cassava starting materials. Bacterial celluloses are also known, typical of which is nata de coco. These natural resources that can serve as starting materials are abundant throughout the Earth, and a great deal of effort has been focused on techniques for taking advantage of fine cellulose fibers as fillers in resins, to allow them to be effectively utilized.

PTL 1 describes a technique of impacting wood pulp or the like in a high-pressure stream jet to obtain fine cellulose fibers, and then derivatizing the fine cellulose fibers to improve the compatibility between hydrophobic resins and the fine cellulose fibers.

In PTLs 2 to 4 there are described techniques of using an ionic liquid for chemical modification (derivatization) of fine cellulose fibers obtained from defibrating treatment of a fiber starting material, to chemically modify the hydroxyl groups of the fine cellulose fibers and increase the heat resistance.

PTL 5 describes a technique for chemically modifying fine cellulose fibers containing lignin to increase the heat resistance, while increasing the compatibility between the fine cellulose fibers and resins due to the lignin.

In PTLs 6 and 7 there are described techniques of adding cellulose pulp to a liquid mixture containing an aprotic solvent, a fine cellulose fiber chemical modifier and a catalyst component that promotes chemical modification, and carrying out continued stirring to prepare chemically modified fine cellulose fibers.

CITATION LIST

Patent Literature

[PTL 1] International Patent Publication No. WO2016/010016

[PTL 2] Japanese Unexamined Patent Publication No. 2013-44076

[PTL 3] Japanese Unexamined Patent Publication No. 2013-43984

[PTL 4] Japanese Unexamined Patent Publication No. 2010-104768

[PTL 5] International Patent Publication No. WO2016/148233

[PTL 6] International Patent Publication No. WO2017/073700

[PTL 7] International Patent Publication No. WO2017/159823

SUMMARY

Technical Problem

Using these prior art techniques can be expected to provide some degree of effect by imparting certain physical properties to the resins, but from the viewpoint of obtaining heat resistance that can withstand use for on-vehicle purposes, there is still a need to provide resin composites with even higher heat resistance.

The problem to be solved by one aspect of the present invention is to provide a resin composite that has high mechanical properties, and that is able to withstand casting and use for members to be used for on-vehicle purposes.

Solution to Problem

Specifically, the present invention encompasses the following aspects.

[1] A resin composite containing 0.5 to 40 mass % of chemically modified fine cellulose fibers, and a resin, wherein the chemically modified fine cellulose fibers have:

a thermal decomposition initiation temperature ($T_D$) of 270° C. or higher, a number-average fiber diameter of 10 nm or greater and less than 1 μm, and a degree of crystallinity of 60% or higher.

[2] The resin composite according to aspect 1, wherein the chemically modified fine cellulose fibers are dispersed in a resin composite in the form of a dispersion comprising a dispersion stabilizer and the chemically modified fine cellulose fibers dispersed in the dispersion stabilizer, and the content of the chemically modified fine cellulose fibers in the dispersion is 10 to 99 mass %.

[3] The resin composite according to aspect 1 or 2, wherein the dispersion stabilizer is at least one selected from the group consisting of surfactants and organic compounds with a boiling point of 160° C. or higher.

[4] The resin composite according to any one of aspects 1 to 3, wherein the resin is at least one type selected from the group consisting of thermoplastic resins, thermosetting resins and photocuring resins.

[5] The resin composite according to aspect 4, wherein the resin is a thermoplastic resin.

[6] The resin composite according to any one of aspects 1 to 5, wherein the resin is at least one selected from the group consisting of polyolefin-based resins, polyacetate-based resins, polycarbonate-based resins, polyamide-based resins, polyester-based resins, polyphenylene ether-based resins and acrylic-based resins.

[7] A resin composite according to any one of aspects 1 to 6, wherein the melting point of the resin is 220° C. or higher.

[8] The resin composite according to any one of aspects 1 to 7, wherein the linear coefficient of thermal expansion (CTE) of the resin composite is 80 ppm/k or smaller.

[9] The resin composite according to any one of aspects 1 to 8, wherein the weight-average molecular weight (Mw) of the chemically modified fine cellulose fibers is 100,000 or greater, and the ratio (Mw/Mn) of the weight-average molecular weight (Mw) and number-average molecular weight (Mn) is 6 or lower.

[10] The resin composite according to any one of aspects 1 to 9, wherein the average degree of substitution of hydroxyl groups of the chemically modified fine cellulose fibers is 0.5 or greater.

[11] The resin composite according to any one of aspects 1 to 10, wherein the chemically modified fine cellulose fibers are esterified fine cellulose fibers.

[12] The resin composite according to any one of aspects 1 to 11, wherein the degree of modification, as defined by the ratio of the peak intensity of the absorption band of the acyl group C═O with respect to the peak intensity of the absorption band of C—H on the cellulose backbone chain, in total reflection-infrared absorption spectrometry of the chemically modified fine cellulose fibers (the IR index 1370), is 0.8 or greater.

[13] The resin composite according to any one of aspects 1 to 12, wherein the degree of modification, as defined by the ratio of the peak intensity of the absorption band of the acyl group C-O with respect to the peak intensity of the absorption band of C-O on the cellulose backbone chain, in total reflection-infrared absorption spectrometry of the chemically modified fine cellulose fibers (the IR index 1030), is 0.13 or greater.

[14] The resin composite according to any one of aspects 1 to 13, wherein the coefficient of variation (CV) of the DS non-uniformity ratio (DSs/DSt), as the ratio of the degree of modification (DSs) of the fiber surface with respect to the degree of modification (DSt) of the entire chemically modified fine cellulose fibers, is 50% or lower.

[15] The resin composite according to any one of aspects 1 to 14, wherein the number-average fiber diameter of the chemically modified fine cellulose fibers is 50 nm to 300 nm.

[16] The resin composite according to any one of aspects 1 to 15, wherein the content of the alkali-soluble portion of the chemically modified fine cellulose fibers is 12 mass % or lower.

[17] The resin composite according to any one of aspects 1 to 16, wherein the average content of the acid-insoluble component per unit specific surface area of the chemically modified fine cellulose fibers is 1.0 mass %·g/m$^2$ or lower.

[18] Chemically modified fine cellulose fibers wherein the weight-average molecular weight (Mw) is 100,000 or higher, the ratio (Mw/Mn) of the weight-average molecular weight (Mw) and number-average molecular weight (Mn) is 6 or lower, the alkali-soluble portion content is 12 mass % or lower and the degree of crystallinity is 60% or higher.

[19] The chemically modified fine cellulose fibers according to aspect 18, wherein the thermal decomposition initiation temperature ($T_D$) is 270° C. or higher and the number-average fiber diameter is 10 nm or greater and less than 1 μm.

[20] The chemically modified fine cellulose fibers according to aspect 18 or 19, which are esterified fine cellulose fibers.

[21] The chemically modified fine cellulose fibers according to any one of aspects 18 to 20, wherein the average degree of substitution of hydroxyl groups is 0.5 or greater.

[22] The chemically modified fine cellulose fibers according to any one of aspects 18 to 21, wherein the coefficient of variation (CV) of the DS non-uniformity ratio (DSs/DSt), as the ratio of the degree of modification (DSs) of the fiber surface with respect to the degree of modification (DSt) of the entire chemically modified fine cellulose fibers, is 50% or lower.

[23] The chemically modified fine cellulose fibers according to any one of aspects 18 to 22, wherein the average content of the acid-insoluble component per unit specific surface area of the chemically modified fine cellulose fibers is 1.0 mass %·g/m$^2$ or lower.

[24] A method for producing chemically modified fine cellulose fibers, which includes:

defibrating a cellulose starting material having a weight-average molecular weight (Mw) of 100,000 or greater, a ratio (Mw/Mn) of weight-average molecular weight (Mw) and number-average molecular weight (Mn) of 6 or lower and an alkali-soluble content of 12 mass % or lower, in a dispersion that includes an aprotic solvent, to obtain fine cellulose fibers, and adding a modifying agent-containing solution to the dispersion to modify the fine cellulose fibers, thereby obtaining chemically modified fine cellulose fibers having a weight-average molecular weight (Mw) of 100,000 or greater, a ratio (Mw/Mn) of weight-average molecular weight (Mw) and number-average molecular weight (Mn) of 6 or lower, an alkali-soluble content of 12 mass % or lower and a degree of crystallinity of 60% or higher.

[25] The method according to aspect 24, wherein the thermal decomposition initiation temperature ($T_D$) of the chemically modified fine cellulose fibers is 270° C. or higher and the number-average fiber diameter is 10 nm or greater and less than 1 μm.

[26] The method according to aspect 24 or 25, wherein the aprotic solvent is dimethyl sulfoxide, and the modifying agent is vinyl acetate or acetic anhydride.

[27] A resin composite containing 0.5 to 40 mass % of chemically modified fine cellulose fibers according to any one of aspects 18 to 23, and a resin.

[28] A resin composite containing 0.5 to 40 mass % of chemically modified fine cellulose fibers and a resin, wherein the DS non-uniformity ratio (DSs/DSt), as the ratio of the degree of modification (DSs) of the fiber surfaces with respect to the degree of modification (DSt) of the entire chemically modified fine cellulose fibers, is 1.1 or greater, and the coefficient of variation (CV) of the DS non-uniformity ratio (DSs/DSt) is 50% or lower.

[29] A method for producing a resin composite containing 0.5 to 40 mass % of chemically modified fine cellulose fibers, and a resin, wherein the method includes:

a defibrating step in which a cellulose starting material is defibrated in a dispersion that includes the cellulose starting material and an aprotic solvent but essentially does not include an ionic liquid or sulfuric acid, to obtain fine cellulose fibers, a modifying step in which a solution that includes a modifying agent is added to the dispersion for chemical modification of the fine cellulose fibers, to obtain chemically modified fine cellulose fibers, and a kneading step in which the chemically modified fine cellulose fibers and the resin are kneaded, the DS non-uniformity ratio (DSs/DSt), as the ratio of the degree of modification (DSs) of the fiber surfaces with respect to the degree of modification (DSt) of the entire chemically modified fine cellulose fibers, is 1.1 or greater, and the coefficient of variation (CV) of the DS non-uniformity ratio (DSs/DSt) is 50% or lower.

[30] A method for producing a resin composite according to any one of aspects 1 to 17, 27 and 28, wherein the method includes:

a step of defibrating cellulose in a dispersion containing a cellulose starting material with a cellulose purity of 85 mass % or greater, and an aprotic solvent, to obtain fine cellulose fibers, a step of adding a solution containing a modifying agent to the dispersion to modify the fine cellulose fibers, thereby obtaining chemically modified fine cellulose fibers having a thermal decomposition initiation temperature ($T_D$) of 270° C. or higher, a number-average fiber diameter of 10 nm or greater and less than 1 μm, and a degree of crystallinity of 60% or higher, and a step of mixing the chemically modified fine cellulose fibers with a resin.

[31] The method according to aspect 29 or 30, wherein the aprotic solvent is dimethyl sulfoxide, and the modifying agent is vinyl acetate or acetic anhydride.

[32] A member for an automobile, comprising a resin composite according to any one of aspects 1 to 17, 27 and 28.

[33] A member for an electronic product, comprising a resin composite according to any one of aspects 1 to 17, 27 and 28.

Advantageous Effects of Invention

The resin composite according to one aspect of the invention can have high mechanical properties, and can withstand casting and use for members to be used for on-vehicle purposes.

DESCRIPTION OF EMBODIMENTS

Figure 1:
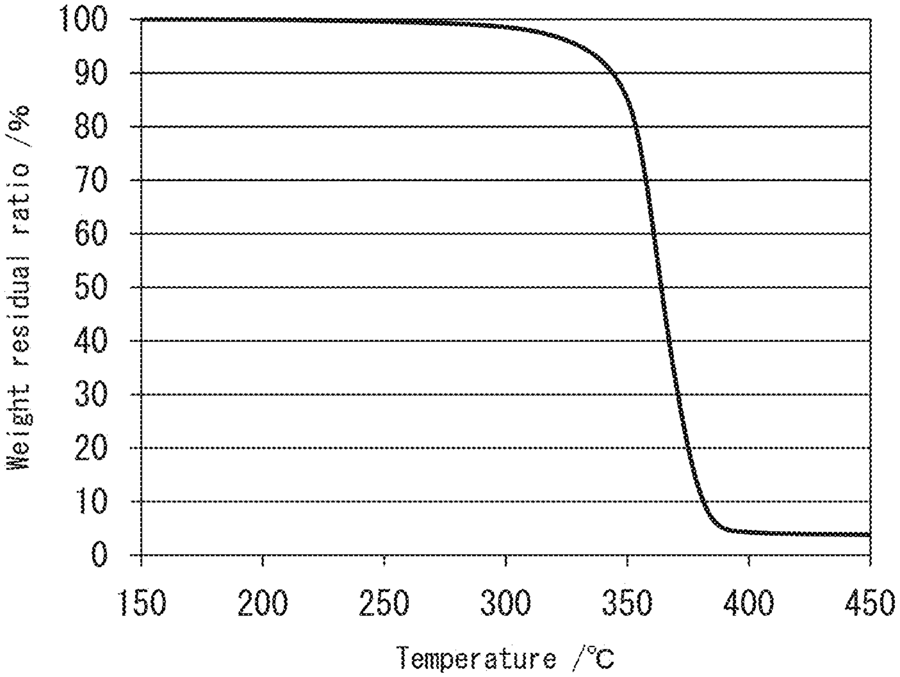
FIG. 1 is an illustration of methods for measuring thermal decomposition initiation temperature ($T_D$) and 1% weight reduction temperature ($T_{1\%}$).
Figure 1:
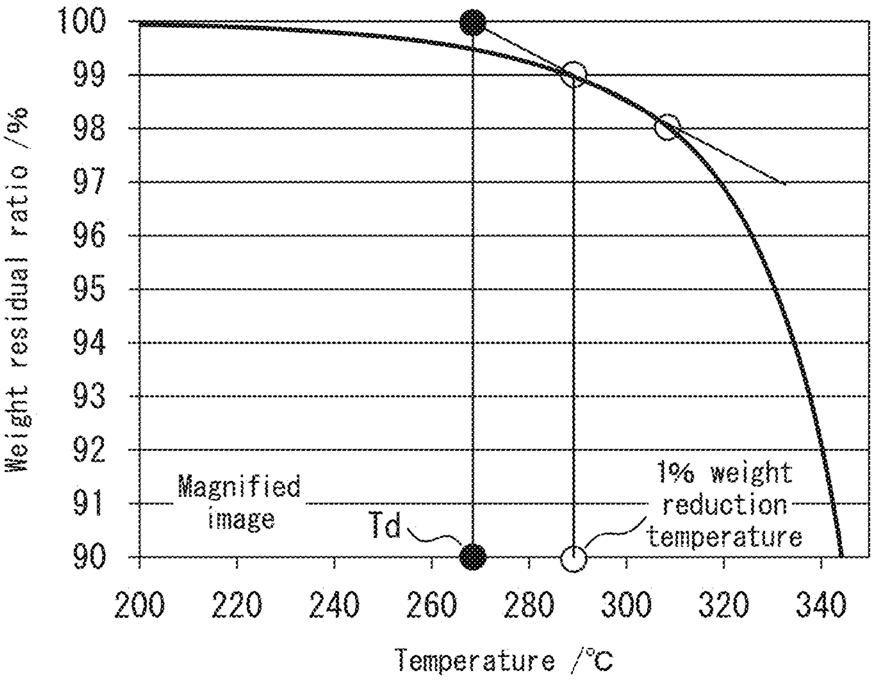

Embodiments for carrying out the invention (hereunder referred to as "the embodiments") will now be explained in detail. The present invention is not limited to the embodiments described below, however, and various modifications may be implemented within the scope of the gist thereof.

First Embodiment

The first embodiment, as one aspect of the invention, provides a resin composite having a thermal decomposition initiation temperature ($T_D$) of 270° C. or higher, a number-average fiber diameter of 10 nm or greater and less than 1 μm, and comprising chemically modified fine cellulose fibers. According to one aspect, the resin composite comprises the chemically modified fine cellulose fibers at 0.5 to 40 mass %. Also according to one aspect, the chemically modified fine cellulose fibers have a degree of crystallinity of 60% or higher.

The term "chemically modified fine cellulose fibers" (also referred to throughout the present disclosure as "chemically modified fine fibers") means fine cellulose fibers of which at least some of the hydroxyl groups in the cellulose backbone have been modified. According to a typical aspect, the cellulose as a whole is not chemically modified, and the chemically modified fine fibers retain the crystal structure of the fine cellulose fibers before chemical modification. The crystalline structure of either or both type I cellulose and type II cellulose can be confirmed by analysis of the chemically modified fine fibers by XRD, for example.

The resin composite comprises chemically modified fine fibers and a resin. The resin composite may also include other components (for example, an inorganic filler). The content of the chemically modified fine fibers in the resin composite of this embodiment is 0.5 to 40 mass %, preferably 2 to 30 mass % and more preferably 3 to 20 mass %, according to one aspect, from the viewpoint of obtaining a resin composite with excellent heat resistance.

The method of removing the chemically modified fine fibers from the resin composite may be a method of using a resin solubilizer to extract the resin component, and then carrying out purification and cleaning to extract the chemically modified fine fibers in dry form or as an aqueous dispersion, without loss of their properties. Examples of resin solubilizers include 1,2,4-trichlorobenzene for polyolefins or hexafluoro-2-isopropanol for 1,2-dichlorobenzene and polyamides, although the resin solubilizer is not limited to these.

From the viewpoint of heat resistance of the resin composite, the number-average fiber diameter of the chemically modified fine fibers in the resin composite according to one aspect is 10 nm or greater and less than 1 μm, preferably 10 nm to 800 nm, more preferably 10 nm to 500 nm, even more preferably 20 nm to 300 nm and most preferably 50 nm to 300 nm. The length/diameter ratio (L/D ratio) of the chemically modified fine fibers, according to one aspect, is 30 or greater, preferably 100 or greater, more preferably 200 or greater, even more preferably 300 or greater and most preferably 500 or greater.

The weight-average molecular weight (Mw) of the chemically modified fine fibers of this embodiment, and the chemically modified fine fibers in the resin composite, is preferably 100,000 or greater and more preferably 200,000 or greater. The ratio (Mw/Mn) of the weight-average molecular weight and number-average molecular weight (Mn) of the chemically modified fine fibers of this embodiment, and the chemically modified fine fibers in the resin composite, is preferably 6 or lower and more preferably 5.4 or lower. A higher weight-average molecular weight means a lower number of terminal groups of the cellulose molecules. Since the ratio (Mw/Mn) of the weight-average molecular weight and number-average molecular weight represents the width of the molecular weight distribution, a smaller Mw/Mn means a lower number of ends of cellulose molecules. Since the ends of the cellulose molecules are origins for thermal decomposition, a high weight-average molecular weight is also a more narrow width of molecular weight distribution, and thus high heat resistance for the fine cellulose fibers and for the resin composite of the fine cellulose fibers and resin. The weight-average molecular weight (Mw) of the chemically modified fine fibers may be 600,000 or lower, or 500,000 or lower, for example, from the viewpoint of greater availability of the cellulose starting material. The ratio (Mw/Mn) of the weight-average molecular weight and number-average molecular weight (Mn) may be 1.5 or greater or 2 or greater, from the viewpoint of easier production of the chemically modified fine fibers. The Mw can be controlled to within this range by selecting a cellulose starting material having the corresponding Mw, or by carrying out appropriate physical treatment and/or chemical treatment of the cellulose starting material. The Mw/Mn ratio can also be controlled to within this range by selecting a cellulose starting material having the corresponding Mw/Mn ratio, or by carrying out appropriate physical treatment and/or chemical treatment of the cellulose starting material. Examples of physical treatment for control of both the Mw and Mw/Mn include physical treatment by application of mechanical force, such as dry grinding or wet grinding with a microfluidizer, ball mill or disk mill, for example, or impacting, shearing, sliding or abrasion with a crusher, homomixer, high-pressure homogenizer or ultrasonic device, for example, while examples of chemical treatment include digestion, bleaching, acid treatment and regenerated cellulose treatment.

The weight-average molecular weight and number-average molecular weight of the cellulose referred to here are the values determined after dissolving the cellulose in lithium chloride-added N,N-dimethylacetamide, and then performing gel permeation chromatography with N,N-dimethylacetamide as the solvent.

The thermal decomposition initiation temperature ($T_D$) of the chemically modified fine fibers in the resin composite, according to one aspect, is 270° C. or higher, preferably 275° C. or higher, more preferably 280° C. or higher and even more preferably 285° C. or higher, from the viewpoint of allowing the desired heat resistance and mechanical strength to be exhibited for on-vehicle purposes. While a higher thermal decomposition initiation temperature is preferred, it is also no higher than 320° C. or no higher than 300° C. from the viewpoint of easier production of the chemically modified fine fibers.

For the purpose of the present disclosure, the $T_D$ value is the value determined from a graph of thermogravimetry (TG) analysis where the abscissa is temperature and the ordinate is weight residual ratio %, as shown in the diagram of FIG. 1 (FIG. 1(B) shows a magnified view of FIG. 1(A)). Starting from the weight of chemically modified fine fibers at 150° C. (with essentially all of the moisture content removed) (0 wt % weight reduction) and increasing the temperature, a straight line is obtained running through the temperature at 1 wt % weight reduction ($T_{1\%}$) and the temperature at 2 wt % weight reduction ($T_{2\%}$). The temperature at the point of intersection between this straight line and a horizontal (baseline) running through the origin at weight reduction 0 wt %, is defined as $T_D$.

The 1% weight reduction temperature ($T_{1\%}$) is the temperature at 1 wt % weight reduction with the 150° C. weight as the origin, after continuous temperature increase by the method for $T_D$ described above.

The 250° C. weight reduction of the chemically modified fine fibers in the resin composite ($T_{250° C.}$) is the weight reduction after the chemically modified fine fibers have been kept for 2 hours at 250° C. under a nitrogen flow, in TG analysis.

According to one aspect, the chemically modified fine fibers of this embodiment have a degree of crystallinity of 60% or higher. If the degree of crystallinity is within this range, the mechanical properties of the chemically modified fine fibers themselves (especially the strength and dimensional stability) will be high, tending to result in high strength and dimensional stability of the resin composite comprising the chemically modified fine fibers dispersed in the resin. A high degree of crystallinity means fewer amorphous sections, and therefore a high degree of crystallinity is also preferred from the viewpoint of heat resistance, considering that amorphous sections can act as origins of deterioration.

The degree of crystallinity of the chemically modified fine fibers is preferably 65% or higher, more preferably 70% or higher and most preferably 80% or higher. Since a higher degree of crystallinity for the chemically modified fine fibers tends to be preferable the upper limit is not particularly restricted, but from the viewpoint of productivity it is preferably an upper limit of 99%.

When the cellulose is type I cellulose crystals (derived from natural cellulose), the degree of crystallinity referred to here is that determined by the following formula, from the diffraction pattern (2θ/deg.=10 to 30) obtained by measurement of the sample by wide-angle X-ray diffraction, based on the Segal method.

$$\text{Degree of crystallinity (\%)} = [I_{(200)} - I_{(amorphous)}] / I_{(200)} \times 100$$

$I_{(200)}$: Diffraction peak intensity at 200 plane (2θ=22.5°) of type I cellulose crystal $I_{(amorphous)}$: Amorphous halo peak intensity for type I cellulose crystal, peak intensity at angle of 4.5° lower than diffraction angle at 200 plane (2θ=18.0°).

When the cellulose is type II cellulose crystals (derived from regenerated cellulose), the degree of crystallinity is determined by the following formula, from the absolute peak intensity h0 at 2θ=12.6° attributed to the (110) plane peak of the type II cellulose crystal, and the peak intensity h1 from the baseline for the plane spacing, in wide-angle X-ray diffraction.

$$\text{Degree of crystallinity (\%)} = h1 / h0 \times 100$$

The known crystalline forms of cellulose include type I, type II, type III and type IV, among which type I and type II are most commonly used, whereas type III and type IV are not commonly used on an industrial scale but have been obtained on a laboratory scale. The chemically modified fine fibers are preferably chemically modified fine fibers containing type I cellulose crystals or type II cellulose crystals, for relatively high mobility in terms of structure and to obtain a resin composite with a lower linear coefficient of thermal expansion and more excellent strength and elongation when subjected to stretching or bending deformation, by dispersion of the chemically modified fine fibers in the resin, and more preferably the chemically modified fine fibers contain type I cellulose crystals and have a degree of crystallinity of 60% or higher.

The chemically modified fine fibers of this embodiment have the hydroxyl groups of the cellulose molecules on the surface of the fine cellulose fibers chemically modified by a cellulose modifying agent. The chemical modification is preferably esterification and more preferably acetylation.

In the chemically modified fine fibers of this embodiment, a large amount of acid-insoluble component including lignin may lead to discoloration by the heat of processing, and therefore the mean content of the acid-insoluble component in the chemically modified fine fibers is preferably as low as possible. Specifically, it is preferably less than 10 mass %, more preferably 8 mass % or lower, even more preferably 7 mass % or lower, yet more preferably 6 mass % or lower and most preferably 5 mass % or lower.

The mean content of the acid-insoluble component is measured using the Klason method, described in non-patent literature (Mokushitsu Kagaku Jikken Manual, ed. The Japan Wood Research Society, pp. 92-97, 2000). The sample is stirred in the sulfuric acid solution to dissolve the cellulose and alkali-soluble component, and then filtered with glass fiber filter paper, and the obtained residue is used as the acid-insoluble component. The acid-insoluble component content is calculated from the weight of the acid-insoluble component, and the average of the acid-insoluble component content calculated for three samples is recorded as the mean content of the acid-insoluble component.

The mean content for the acid-insoluble component in the chemically modified fine fibers of this embodiment can be calculated from the mean content for the acid-insoluble component in the cellulose starting material used for production of the chemically modified fine fibers.

The mean content for the acid-insoluble component with respect to the specific surface area of the chemically modified fine fibers is especially important in terms of the relationship between the acid-insoluble component and the dynamic properties of the resin composite. Specifically, a low abundance of acid-insoluble component at the interface between the cellulose fiber surfaces and the resin helps to avoid loss of the dynamic properties of the resin composite that is reinforced by the chemically modified fine fibers.

The mean content for the acid-insoluble component per unit specific surface area of the chemically modified fine fibers is preferably 1.0 mass %·g/$m^2$ or lower, more preferably 0.6 mass %·g/$m^2$ or lower, even more preferably 0.5 mass %·g/$m^2$ or lower, even more preferably 0.4 mass %·g/$m^2$ or lower and most preferably 0.2 mass %·g/$m^2$ or lower. It is preferred to have a lower mean content for the acid-insoluble component, and more preferably it is 0 mass %·g/$m^2$. The specific surface area of the chemically modified fine fibers can be calculated as the BET specific surface area obtained using a specific surface area/pore distribution measuring apparatus (by Quantachrome Instruments) with the program of the apparatus, after measuring the nitrogen gas adsorption at the boiling point of liquid nitrogen at five points (multipoint method) in a relative vapor pressure ($P/P_0$) range of 0.05 to 0.2, for a porous sheet sample of the chemically modified fine fibers.

According to one aspect, the alkali-soluble portion content of the chemically modified fine fibers is 12 mass % or lower, preferably 11 mass % or lower and even more preferably 8 mass % or lower. The alkali-soluble portion for the present disclosure also encompasses β-cellulose and γ-cellulose, in addition to hemicellulose. The alkali-soluble portion is understood by those skilled in the art to consist of the components that are obtained as the alkali-soluble portion of holocellulose (that is, the components other than α-cellulose in the holocellulose), upon solvent extraction and chlorine treatment of a plant (such as wood). Since the alkali-soluble portion consists of hydroxyl group-containing polysaccharides with poor heat resistance, which can lead to inconveniences such as decomposition when subjected to heat, yellowing due to heat aging and reduced strength of the cellulose fibers, it is preferred to have a lower alkali-soluble portion content in the chemically modified fine fibers. The alkali-soluble portion content in the chemically modified fine fibers is most preferably 0 mass %, but it may be 3 mass % or greater or 6 mass % or greater from the viewpoint of easier availability of the cellulose starting material.

The alkali-soluble portion content can be determined by a method described in non-patent literature (Mokushitsu Kagaku Jikken Manual, ed. The Japan Wood Research Society, pp. 92-97, 2000), subtracting the α-cellulose content from the holocellulose content (Wise method). The alkali-soluble portion content in the chemically modified fine fibers will usually be essentially the same as the alkali-soluble portion content in the cellulose starting material used for production of the chemically modified fine fibers (that is, it may be assumed that there is essentially no selective removal of the alkali-soluble portion under ordinary conditions for chemical modification (typically weakly acidic to neutral pH)). According to one aspect, the value of the alkali-soluble portion content of the cellulose starting material may be considered to be the alkali-soluble portion content in the chemically modified fine fibers.

The chemically modified fine fibers of this embodiment, and their production method, as well as the resin composite and its production method, will now be described.

The cellulose fibers used as starting material for the chemically modified fine fibers (also referred to as "cellulose starting material) may be natural cellulose or regenerated cellulose. Natural cellulose includes wood pulp obtained from wood sources (broadleaf trees or conifers), nonwood pulp obtained from non-wood sources (cotton, bamboo, hemp, bagasse, kenaf, cotton linter, sisal and straw), and cellulose fiber aggregates obtained from sources such as animals (such as sea squirts) and algae, microbes (such as acetic acid bacteria) and microbial products. Regenerated cellulose for use may be cut yarn of regenerated cellulose fibers (such as viscose, cupra and Tencel), cut yarn of cellulose derivative fibers, and superfine yarn of regenerated cellulose or cellulose derivatives, obtained by electrospinning methods. These starting materials may have their fiber diameters, fiber lengths or fibrilization degrees adjusted by beating, fibrilization or micronization with mechanical force using a grinder or refiner, or they may be subjected to bleaching and purification with chemicals, or their non-cellulose contents such as lignin or hemicellulose may also be adjusted, as necessary.

The content of acid-insoluble components (especially lignin) in the cellulose starting material is preferably as low as possible. The modifying agent used for chemical modification of the fine cellulose fibers is consumed by secondary reaction with the acid-insoluble component, often resulting in residue of the secondary reaction products in the fine cellulose fibers after chemical modification. This lowers production process yield and hampers quality control, and also causes yellowing by heat during production of the resin composite. From this viewpoint, the content of the acid-insoluble component in the cellulose starting material is preferably less than 10 mass %, more preferably 8 mass % or lower, even more preferably 7 mass % or lower, yet more preferably 6 mass % or lower and most preferably 5 mass % or lower. The content of the acid-insoluble component in the cellulose starting material is most preferably 0 mass %, but it may be 1 mass % or greater, greater or 2 mass % or greater, 3 mass % or greater or 4 mass % or greater, from the viewpoint of casier availability of the cellulose starting material.

The content of the alkali-soluble portion (especially hemicellulose) in the cellulose starting material is preferably as low as possible. The modifying agent used for chemical modification of the fine cellulose fibers is consumed by secondary reaction with the alkali-soluble portion, often resulting in residue of the secondary reaction products in the fine cellulose fibers after chemical modification. This lowers production process yield and hampers quality control, and also causes yellowing by heat during production of the resin composite. From this viewpoint, the content of the alkali-soluble portion (especially hemicellulose) in the cellulose starting material is preferably 13 mass % or lower, more preferably 12 mass % or lower, even more preferably 11 mass % or lower, yet more preferably 8 mass % or lower and most preferably 5 mass % or lower. The content of the alkali-soluble portion (especially hemicellulose) in the cellulose starting material is most preferably 0 mass %, but it may be 3 mass % or greater or 6 mass % or greater from the viewpoint of easier availability of the cellulose starting material.

The modifying agent used may be a compound that reacts with the hydroxyl groups of cellulose, and esterifying agents, etherifying agents and silylating agents may be mentioned. Esterifying agents are particularly preferred. Preferred esterifying agents are acid halides, acid anhydrides and vinyl carboxylate esters.

An acid halide may be one or more selected from the group consisting of compounds represented by the following formula (1).

$$R1—C(=O)—X \quad (1)$$

(In the formula, R1 represents an alkyl group of 1 to 24 carbon atoms, an alkylene group of 1 to 24 carbon atoms, a cycloalkyl group of 3 to 24 carbon atoms or an aryl group of 6 to 24 carbon atoms, and X is Cl, Br or I.) Specific examples of acid halides include acetyl chloride, acetyl bromide, acetyl iodide, propionyl chloride, propionyl bromide, propionyl iodide, butyryl chloride, butyryl bromide, butyryl iodide, benzoyl chloride, benzoyl bromide and benzoyl iodide, with no limitation to these. Acid chlorides are preferably used among these from the viewpoint of reactivity and handleability. For reaction of an acid halide, one or more alkaline compounds may also be added to neutralize the acidic by-products, while simultaneously acting as a catalyst. Specific examples of alkaline compounds include: tertiary amine compounds such as tricthylamine and trimethylamine; and nitrogen-containing aromatic compounds such as pyridine and dimethylaminopyridine; with no limitation to these.

Any suitable acid anhydride may be used as an acid anhydride. Examples include saturated aliphatic monocarboxylic anhydrides of acetic acid, propionic acid, (iso) butyric acid and valeric acid; unsaturated aliphatic monocarboxylic anhydrides of (meth)acrylic acid and oleic acid; alicyclic monocarboxylic anhydrides of cyclohexanecarboxylic acid and tetrahydrobenzoic acid; aromatic monocarboxylic anhydrides of benzoic acid and 4-methylbenzoic acid; dibasic carboxylic anhydrides, for example: saturated aliphatic dicarboxylic acid anhydrides such as succinic anhydride and adipic anhydride, unsaturated aliphatic dicarboxylic anhydrides such as maleic anhydride and itaconic anhydride, alicyclic dicarboxylic acid anhydrides such as 1-cyclohexene-1,2-dicarboxylic anhydride, hexahydrophthalic anhydride and methyltetrahydrophthalic anhydride, and aromatic dicarboxylic anhydrides such as phthalic anhydride and naphthalic anhydride; and tribasic or greater polybasic carboxylic anhydrides, for example: polycarboxylic acid (anhydrides) such as trimellitic anhydride and pyromellitic anhydride. The catalyst added for reaction of an acid anhydride may be one or more acidic compounds such as sulfuric acid, hydrochloric acid or phosphoric acid, or Lewis acids such as metal chlorides or metal triflates, or alkaline compounds such as tricthylamine or pyridine.

Preferred vinyl carboxylate esters are vinyl carboxylate esters represented by the following formula (2):

$$R—COO—CH—CH_2: \quad \text{formula (2)}$$

{where R is an alkyl group of 1 to 24 carbon atoms, an alkylene group of 1 to 24 carbon atoms, a cycloalkyl group of 3 to 24 carbon atoms or an aryl group of 6 to 24 carbon atoms}. Vinyl carboxylate esters are more preferably one or more selected from the group consisting of vinyl acetate, vinyl propionate, vinyl butyrate, vinyl caproate, vinyl cyclohexanecarboxylate, vinyl caprylate, vinyl caprate, vinyl laurate, vinyl myristate, vinyl palmitate, vinyl stearate, vinyl pivalate, vinyl octylate, divinyl adipate, vinyl methacrylate, vinyl crotonate, vinyl pivalate, vinyl octylate, vinyl benzoate and vinyl cinnamate. During esterification reaction with a vinyl carboxylate ester, one or more catalysts may be added that are selected from the group consisting of alkali metal hydroxides, alkaline earth metal hydroxides, primary to tertiary amines, quaternary ammonium salts, imidazole and its derivatives, pyridine and its derivatives, and alkoxides.

Alkali metal hydroxides and alkaline earth metal hydroxides include sodium hydroxide, potassium hydroxide, lithium hydroxide, calcium hydroxide and barium hydroxide.

Primary to tertiary amines are primary amines, secondary amines and tertiary amines, specific examples of which include ethylenediamine, diethylamine, proline, N,N,N',N'-tetramethylethylenediamine, N,N,N',N'-tetramethyl-1,3-propanediamine, N,N,N',N'-tetramethyl-1,6-hexanediamine, tris(3-dimethylaminopropyl)amine, N,N-dimethylcyclohexylamine and triethylamine.

Imidazole and its derivatives include 1-methylimidazole, 3-aminopropylimidazole and carbonyldiimidazole.

Pyridine and its derivatives include N,N-dimethyl-4-aminopyridine and picoline.

Alkoxides include sodium methoxide, sodium ethoxide and potassium-t-butoxide.

Particularly preferred among these esterification reactants are one or more selected from the group consisting of acetic anhydride, propionic anhydride, butyric anhydride, vinyl acetate, vinyl propionate and vinyl butyrate, among which acetic anhydride and vinyl acetate are especially preferred from the viewpoint of reaction efficiency.

According to one aspect, the chemically modified fine cellulose fibers can be obtained by defibrating a cellulose starting material, having a weight-average molecular weight (Mw) of 100,000 or greater, a ratio (Mw/Mn) of weight-average molecular weight (Mw) and number-average molecular weight (Mn) of 6 or lower and an alkali-soluble portion content of 12 mass % or lower, in a dispersion containing an aprotic solvent, to obtain fine cellulose fibers, or adding a solution containing a modifying agent to the dispersion to modify the fine cellulose fibers, and the obtained chemically modified fine fibers may have a thermal decomposition initiation temperature ($T_D$) of 270° C. or higher, a number-average fiber diameter of 10 nm or greater and less than 1 um and a degree of crystallinity of 60% or higher. Chemical modification after preparation of fine cellulose fibers by defibrating is advantageous from the viewpoint of lowering the coefficient of variation of the DS non-uniformity ratio (DSs/DSt).

The method for reducing the maximum fiber diameter in order to convert the cellulose starting material to fine cellulose fibers is not particularly restricted, but it is preferred for the defibrating treatment conditions (creation of the shear field or the size of the shear field) to be as efficient as possible. In particular, a defibrating solution containing an aprotic solvent is impregnated with a cellulose starting material with a cellulose purity of 85 mass % or greater, and swelling of the cellulose is induced in a short period of time, while merely applying the energy of a small degree of stirring and shear for micronization of the cellulose. Also, a cellulose modifying agent may be added immediately after defibrating, to obtain chemically modified fine fibers. This method is preferred from the viewpoint of production efficiency and refining efficiency (i.e. the high purity of the chemically modified fine fibers), as well as the physical properties of the resin composite.

The aprotic solvent may be an alkyl sulfoxide, an alkylamide or pyrrolidone, for example. Any of these solvents may be used alone or in combinations of two or more.

Examples of alkyl sulfoxides include di-C1-4 alkyl sulfoxides such as dimethyl sulfoxide (DMSO), methylethyl sulfoxide and diethyl sulfoxide.

Examples of alkylamides include N,N-di-C1-4 alkylformamides such as N,N-dimethylformamide (DMF) and N,N-diethylformamide; and N,N-di-C1-4 alkylacetamides such as N,N-dimethylacetamide (DMAc) and N,N-diethylacetamide.

Examples of pyrrolidones include pyrrolidones such as 2-pyrrolidone and 3-pyrrolidone; and N-C1-4 alkylpyrrolidones such as N-methyl-2-pyrrolidone (NMP).

Any of these aprotic solvents may be used alone or in combinations of two or more. Among these aprotic solvents using DMSO (29.8), DMF (26.6), DMAc (27.8) and NMP (27.3) (the numerals in parentheses indicating the donor numbers), and especially DMSO, allows chemically modified fine fibers with a high thermal decomposition initiation temperature to be more efficiently produced. While the action mechanism for this is not completely understood, it is theorized to be due to homogeneous microswelling of the cellulose starting material in the aprotic solvent.

When the cellulose starting material for the fine cellulose fibers swells in the aprotic solvent, the aprotic solvent rapidly permeates the fibrils composing the starting material and swells them, such that the microfibrils are converted to a fine defibrated state. After this state has been created, chemical modification is carried out to promote chemical modification in a homogeneous manner throughout all of the microfilaments, by which, presumably, high heat resistance is obtained. In addition, the microfibrillated chemically modified fine fibers maintain a high degree of crystallinity, and allow high mechanical properties and excellent dimensional stability (especially a very low linear coefficient of thermal expansion) to be obtained when composited with resins.

On the other hand, when fine cellulose fibers produced by defibrating in water or a protic solvent have been chemically modified by replacement with an aprotic solvent, the improvement in heat resistance by the chemical modification is somewhat attenuated. While the action mechanism for this is not completely understood, it is conjectured that the high liquid-absorbing property of cellulose hampers complete replacement to the aprotic solvent, and therefore homogeneous chemical modification does not proceed due to the residual water or protic solvent.

According to a preferred aspect, the aprotic solvent is dimethyl sulfoxide, and the modifying agent is vinyl acetate or acetic anhydride. From the viewpoint of inhibiting yellowing of the chemically modified fine fibers or resin composite and reducing variation in chemical modification, the ionic liquid in the dispersion is preferably at a content of less than 20 mass %, more preferably it is essentially absent (specifically, 1 mass % or lower), and most preferably it is completely absent. In addition, sulfuric acid is preferably essentially absent (specifically, 1 mass % or lower), and more preferably it is completely absent, in the dispersion.

The micronized (defibrated) and chemically modified microfilaments may be prepared using an apparatus that applies impact shearing, such as a planetary ball mill or bead mill, an apparatus that applies a rotating shear field that induces fibrillation of cellulose, such as a disc refiner or grinder, or an apparatus that can carry out functions of kneading, agitation and dispersion in a highly efficient manner, such as any of various types of kneaders or planetary mixers, or a rotary homogenizing mixer, with no limitation to these.

In the attenuated total reflection infrared absorption spectrum of the chemically modified fine fibers, the peak locations of the absorption bands vary depending on the type of chemically modified groups. Based on variation in the peak locations it is possible to determine on which absorption bands the peaks are based, allowing identification of modifying groups. It is also possible to calculate the modification rate from the peak intensity ratio of peaks attributable to the modifying groups and peaks attributable to the cellulose backbone.

Figure 2:
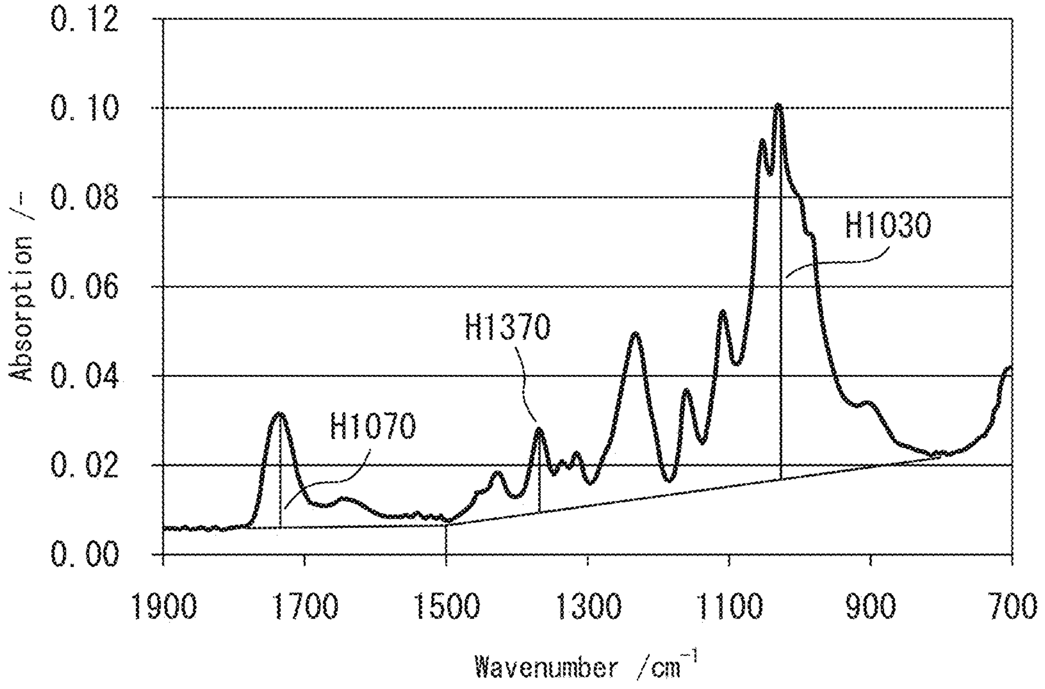
FIG. 2 is an illustration of a method for calculating the IR index 1370 and IR index 1030.

For example, if the modifying group is an acyl group, the peak of the absorption band for the acyl group C═O appears at 1730 $cm^{-1}$, the peak of the absorption band for cellulose backbone chain C—H groups appears at 1370 $cm^{-1}$, and the peak of the absorption band for cellulose backbone chain C—O groups appears at 1030 $cm^{-1}$ (see FIG. 2).

When the chemically modified groups of the chemically modified fine fibers are acyl groups, the degree of modification (modification rate) (IR index 1370), as defined by the ratio of the peak intensity of the absorption band of the chemically modified groups (peak height of absorption band for acyl C═O groups) with respect to the peak intensity (height) of the absorption band for cellulose backbone chain C—H groups (peak height of absorption band for chemically modified groups/peak height of absorption band for cellulose backbone chain C—H groups), in the attenuated total reflection infrared absorption spectrum, is preferably 0.28 to 1.8. If the IR index 1370 is 0.28 or greater, it will be possible to obtain a resin composite containing chemically modified fine fibers with a high thermal decomposition initiation temperature. If it is 1.8 or lower, unmodified cellulose backbone will remain in the chemically modified fine fibers, making it possible to obtain a resin composite containing chemically modified fine fibers which exhibits both the high tensile strength and dimensional stability of the cellulose and the high thermal decomposition initiation temperature due to chemical modification. The IR index 1370 is more preferably 0.44 or greater, even more preferably 0.50 or greater, yet more preferably 0.56 or greater, especially preferably 0.77 or greater and most preferably 0.87 or greater, and more preferably 1.68 or lower, even more preferably 1.50 or lower, yet more preferably 1.31 or lower and most preferably 1.17 or lower.

The degree of modification (modification rate) (IR index 1030), as defined by the ratio of the peak intensity of the absorption band for the chemically modified groups (peak height of absorption band for acyl C═O groups) with respect to the peak intensity (height) of the absorption band for cellulose backbone chain C—O groups (peak height of absorption band for chemically modified groups/peak height of absorption band for cellulose backbone chain C—O groups), in the attenuated total reflection infrared absorption spectrum, is preferably 0.024 to 0.48. If the IR index 1030 is 0.024 or greater, it will be possible to obtain a resin composite containing chemically modified fine fibers with a high thermal decomposition initiation temperature. If it is 0.48 or lower, unmodified cellulose backbone will remain in the chemically modified fine fibers, making it possible to obtain a resin composite containing chemically modified fine fibers, which exhibits both the high tensile strength and dimensional stability of the cellulose and the high thermal decomposition initiation temperature due to chemical modification. The IR index 1030 is more preferably 0.048 or greater, even more preferably 0.061 or greater, yet more preferably 0.073 or greater, especially preferably 0.13 or greater and most preferably 0.15 or greater, and more preferably 0.44 or lower, even more preferably 0.36 or lower, yet more preferably 0.30 or lower and most preferably 0.25 or lower.

The peak heights at 1730 $cm^{-1}$, 1370 $cm^{-1}$ and 1030 $cm^{-1}$ used for calculation of the IR index 1370 and IR index 1030 are read off in the following manner. For the peak intensity at 1730 $cm^{-1}$, a baseline connecting locations near 1550 $cm^{-1}$ and near 1850 $cm^{-1}$ without other peaks is drawn with a straight line, and the height of the baseline at 1730 $cm^{-1}$ is subtracted from the peak height at 1730 $cm^{-1}$ as the read value.

For the peak intensity at 1370 $cm^{-1}$, a baseline connecting locations near 820 $cm^{-1}$ and near 1530 $cm^{-1}$ without other peaks is drawn with a straight line, and the height of the baseline at 1370 $cm^{-1}$ is subtracted from the peak height at 1370 $cm^{-1}$ as the read value.

For the peak intensity at 1030 $cm^{-1}$, a baseline connecting locations near 820 $cm^{-1}$ and near 1530 $cm^{-1}$ without other peaks is drawn with a straight line, and the height of the baseline at 1030 $cm^{-1}$ is subtracted from the peak height at 1030 $cm^{-1}$ as the read value.

The IR index 1030 can be calculated as the average degree of substitution of hydroxyl groups of the chemically modified fine fibers according to the following formula (the average number of hydroxyl groups replaced per glucose as the basic structural unit of cellulose, also known as DS).

$$\text{DS}=4.13\times\text{IR Index 1030}$$

The average degree of substitution is preferably 0.1 to 2.0. If DS is 0.1 or greater, it will be possible to obtain a resin composite containing chemically modified fine fibers with a high thermal decomposition initiation temperature. If it is 2.0 or lower, unmodified cellulose backbone will remain in the chemically modified fine fibers, making it possible to obtain a resin composite containing chemically modified fine fibers, which exhibits both the high tensile strength and dimensional stability of the cellulose and the high thermal decomposition initiation temperature due to chemical modification. DS is more preferably 0.2 or greater, more preferably 0.25 or greater, even more preferably 0.3 or greater and most preferably 0.5 or greater, and preferably 1.8 or lower, more preferably 1.5 or lower, even more preferably 1.2 or lower and most preferably 1.0 or lower.

For chemically modified fine fibers of this embodiment, the DS non-uniformity ratio (DSs/DSt), defined as the ratio of the degree of modification (DSs) of the fiber surfaces with respect to the degree of modification (DSt) of the entire fibers, is preferably 1.05 or greater. A larger value for the DS non-uniformity ratio corresponds to a more non-uniform structure similar to a sheath-core structure (that is, while the fiber surfaces are highly chemically modified, the center sections of the fibers maintain the original largely unmodified cellulose structure), which helps to provide the high tensile strength and dimensional stability of cellulose while improving the affinity with the resin when used in a resin composite and improving the dimensional stability of the resin composite. The DS non-uniformity ratio is preferably 1.1 or greater, more preferably 1.2 or greater and even more preferably 1.5 or greater, while from the viewpoint of case of production of the chemically modified fine fibers, it is preferably 6 or lower, more preferably 4 or lower and even more preferably 3 or lower.

The values of DSs and DSt vary depending on the degree of modification of the chemically modified fine fibers, but for example, the preferred range for DSs is 0.5 to 3.0 and the preferred range for DSt is 0.1 to 2.0.

In the chemically modified fine fibers of this embodiment, a lower coefficient of variation (CV) of the DS non-uniformity ratio is preferred because it corresponds to less variation in the physical properties of the resin composite. It is preferably 50% or lower, more preferably 40% or lower, even more preferably 30% or lower and most preferably 20% or lower. When producing the chemically modified fine fibers, the coefficient of variation can be lowered by a method of first defibrating the cellulose starting material and then carrying out the chemical modification (sequential method). It can be increased, on the other hand, by a method of simultaneously defibrating and chemically modifying the cellulose starting material (simultaneous method). While the action mechanism for this is not completely understood, it is believed that in the simultaneous method, chemical modification proceeds further with the narrow fibers produced by initial defibrating, and the chemical modification causes reduction in hydrogen bonding between the cellulose microfibrils, thus promoting further defibration and resulting in a larger coefficient of variation of the DS non-uniformity ratio.

The coefficient of variation (CV) of the DS non-uniformity ratio is obtained by sampling 100 g of the aqueous dispersion of the chemically modified fine fibers (solid content: ≥10 mass %), using 10 g each of the freeze-shattered substance as measuring samples, calculating the DS non-uniformity ratio from DSt and DSs for the 10 samples, and calculating the coefficient of variation from the standard deviation (σ) and arithmetic mean (μ) of the DS non-uniformity ratio between the 10 samples.

$$DS\ \text{Non-uniformity ratio} = DSs/DSt$$

$$\text{Coefficient of variation (\%)} = \text{standard deviation }\sigma/\text{arithmetic mean }\mu\times 100$$

The method of calculating DSt may be subjecting the freeze-shattered chemically modified fine fibers to $^{13}C$ solid NMR measurement, according to the following formula using the area intensity (Inf) of the signal attributed to one carbon atom of the modifying group, with respect to the total area intensity (Inp) of the signals attributed to C1-C6 carbons of the pyranose rings of cellulose, appearing in the range of 50 ppm to 110 ppm.

$$DSt=(Inf)\times 6/(Inp)$$

For example, when the modifying group is acetyl, the signal at 23 ppm attributed to —$CH_3$ may be used.

The conditions in the $^{13}C$ solid NMR measurement may be as follows, for example.

Apparatus: Bruker Biospin Avance 500WB
Frequency: 125.77 MHz
Measuring method: DD/MAS
Latency time: 75 sec
NMR sample tube: 4 mmφ
Number of scans: 640 (~14 hr)
MAS: 14,500 Hz
Chemical shift reference: glycine (external reference: 176.03 ppm)

As the method of calculating DSs, a powder sample of the chemically modified fine fibers used for $^{13}C$ solid NMR measurement is placed on a 2.5 mmφ dish-shaped sample stand, the surface is pressed flat, and measurement is performed by X-ray photoelectron spectroscopy (XPS). The XPS spectrum reflects the structural elements and chemically bonded state of the sample surface layer alone (typically about several nanometers). The obtained C1s spectrum is analyzed by peak separation, and calculation is performed by the following formula using the area intensity (Ixf) of the peak attributed to one carbon atom of the modifying group, with respect to the area intensity (Ixp) of the peak attributed to the C2-C6 carbons of the pyranose rings of cellulose (289 eV, C—C bond).

$$DSs=(Ixf)\times 5/(Ixp)$$

For example, when the modifying group is acetyl, the C1s spectrum is analyzed by peak separation at 285 eV, 286 eV, 288 eV and 289 eV, and the peak at 289 eV may be used for Ixp while the peak due to acetyl group O—C═O bonds (286 eV) may be used for Ixf.

The conditions for XPS measurement are the following, for example.

Device: VersaProbe II by Ulvac-Phi, Inc.
Excitation source: mono. AlKα 15 kV×3.33 mA
Analysis size: ~200 μmφ
Photoelectron take-off angle: 45°
Capture range
Narrow scan: C 1s, O 1s
Pass Energy: 23.5 eV For a resin composite according to a typical aspect, the resin forms a matrix, with the chemically modified fine fibers dispersed in the resin.

According to one aspect, the resin composite can be produced by a production method comprising a step of defibrating cellulose in a dispersion containing a cellulose starting material at a purity of 85 mass % or greater, and an aprotic solvent, to obtain fine cellulose fibers, and then adding a solution containing a modifying agent to the dispersion to modify the fine cellulose fibers, thereby obtaining chemically modified fine fibers having a thermal decomposition initiation temperature ($T_D$) of 270° C. or higher, a number-average fiber diameter of 10 nm or greater and less than 1 um (and with a degree of crystallinity of 60% or higher, according to one aspect), and a step of mixing the chemically modified fine fibers with a resin. Thus, the method of chemical modification after preparation of fine cellulose fibers by defibrating is advantageous from the viewpoint of lowering the coefficient of variation of the DS non-uniformity ratio (DSs/DSt). From the viewpoint of inhibiting yellowing of the chemically modified fine fibers or resin composite and reducing variation in chemical modification, the ionic liquid in the dispersion is preferably at a content of less than 20 mass %, more preferably it is essentially absent (specifically, 1 mass % or lower), and most preferably it is completely absent. In addition, sulfuric acid is preferably essentially absent (specifically, 1 mass % or lower), and more preferably it is completely absent, in the dispersion.

Using a cellulose starting material with a purity (α-cellulose content) of 85 mass % or greater, as the starting material for the type I cellulose crystals, is preferred from the viewpoint of the production efficiency and refining efficiency of the chemically modified fine fibers (that is, the purity of the chemically modified fine fibers), and the physical properties when composited with a resin. The cellulose purity is more preferably 90 mass % or greater and even more preferably 95 mass % or greater.

The cellulose purity can be determined by a method for measuring α-cellulose content described in non-patent literature (Mokushitsu Kagaku Jikken Manual, ed. The Japan Wood Research Society, pp. 92-97, 2000).

The starting material for the type II cellulose crystals may exhibit a low cellulose purity when using a method of measuring the α-cellulose content (the α-cellulose content measuring method is a method originally developed for analysis of type I cellulose crystal starting materials such as wood). However, a starting material for type II cellulose crystals is a product processed and produced using type I cellulose crystals as starting material (such as viscose rayon, cupra, lyocell or mercerized cellulose), the original cellulose purity is high. The type II cellulose crystal starting material is therefore suitable as a starting material for the chemically modified fine fibers of the invention even with a cellulose purity of less than 85 mass %.

The resin composite may also include cellulose whiskers in addition to the chemically modified fine fibers. Cellulose whiskers improve the dispersibility of the chemically modified fine fibers by admixture with the chemically modified fine fibers, resulting in improved dynamic properties of the resin composite. The major property of cellulose whiskers is L/D=1 to <30, preferably L/D=1 to 20 and more preferably L/D=1 to 10, without being limited to this range. The degree of crystallinity of the cellulose whiskers is 70% or higher, for example, and is preferably 80% or higher. The degree of polymerization of the cellulose whiskers is 600 or lower and preferably 300 or lower. The cellulose whiskers used may be a commercially available product, and for example, it may be obtained by cutting wood pulp and promoting hydrolysis in an aqueous hydrochloric acid solution.

Using a dispersion stabilizer that has the function of stably dispersing the chemically modified fine fibers, together with the chemically modified fine fibers, to increase and control the dispersed state of the chemically modified fine fibers in the resin, is effective for improving the mechanical properties of the resin composite. The content ratio of the dispersion stabilizer in the resin composite is appropriately selected in a range that does not interfere with the desired effect of the invention, and for example, it may be 0.01 to 50 mass %, 0.1 to 30 mass %, 0.5 to 20 mass % or 1.0 to 10 mass %.

According to a more preferred aspect, the chemically modified fine fibers are dispersed in the resin composite in the form of a cellulose dispersion containing a dispersion stabilizer. The chemically modified fine fiber content in the cellulose dispersion is preferably 10 to 99 mass %, more preferably 10 to 90 mass % and even more preferably 50 to 90 mass %. When the chemically modified fine fiber content is higher, the dispersion of the chemically modified fine fibers is poor and the mechanical properties are insufficiently improved, and when it is lower, the dispersion stabilizer causes the resin to become too sparse, resulting in poor mechanical properties. A portion of the dispersion stabilizer may elute from the cellulose dispersion during production of the resin composite, and may diffuse in the matrix resin in the resin composite.

The dispersion stabilizer may be one or more selected from the group consisting of surfactants, organic compounds with boiling points of 160° C. or higher, and resins having chemical structures that are able to highly disperse the chemically modified fine fibers, and preferably one or more selected from the group consisting of surfactants and organic compounds with boiling points of 160° C. or higher.

The surfactant may be one having a chemical structure in which a site with a hydrophilic substituent and a site with a hydrophobic substituent are covalently bonded, and any ones utilized for a variety of purposes including consumption and industrial use may be used. The following, for example, may be used, either alone or in combinations of two or more.

The surfactant used may be any anionic surfactant, nonionic surfactant, zwitterionic surfactant or cationic surfactant, but from the viewpoint of affinity with cellulose, an anionic surfactant or nonionic surfactant is preferred, and a nonionic surfactant is more preferred.

Among the above, from the viewpoint of affinity with cellulose, surfactants having polyoxyethylene chains, carboxyl groups or hydroxyl groups as hydrophilic groups are preferred, polyoxyethylene-based surfactants with polyoxyethylene chains as hydrophilic groups (polyoxyethylene derivatives) are more preferred, and nonionic polyoxyethylene derivatives are even more preferred. The polyoxyethylene chain length of a polyoxyethylene derivative is preferably 3 or greater, more preferably 5 or greater, even more preferably 10 or greater and most preferably 15 or greater. A longer chain length will increase the affinity with cellulose, but for balance with the properties desired for the resin composite (for example, the coating property), it is preferably no greater than 60, as the upper limit, more preferably no greater than 50, even more preferably no greater than 40, especially preferably no greater than 30 and most preferably no greater than 20.

Of the aforementioned surfactants, it is especially preferred to use those with alkyl ether-type, alkylphenyl ether-type, rosin ester-type, bisphenol A-type, β-naphthyl-type, styrenated phenyl-type or hydrogenated castor oil-type hydrophobic groups, because of their high affinity with resins. The alkyl chain length (the number of carbon atoms excluding the phenyl group in the case of alkylphenyl) is a carbon chain of preferably 5 or greater, more preferably 10 or greater, even more preferably 12 or greater and most preferably 16 or greater carbon atoms. When the resin is a polyolefin-based resin, for example, a greater number of carbon atoms of the surfactant increases affinity with the resin, and therefore while there is no strict upper limit, the upper limit for the number of carbon atoms is preferably no more than 30 and more preferably no more than 25.

Preferred among these hydrophobic groups are those having a cyclic structure and those having bulk and a polyfunctional structure. Those with a cyclic structure include alkylphenyl ether-type, rosin ester-type, bisphenol A-type, β-naphthyl-type and styrenated phenyl-type groups, and those with a polyfunctional structure include hydrogenated castor oil-type groups.

More particularly preferred among these are rosin ester types and hydrogenated castor oil types.

Organic compounds with boiling points of 160° C. or higher are effective as non-surfactant dispersing media, although this will depend on the type of resin. Specific examples of such organic compounds that are effective include high-boiling-point organic solvents such as liquid paraffin and decalin, when the resin is a polyolefin-based resin. When the resin is a polar resin such as a polyamide-based resin or polyacetate-based resin, it is effective to use the same solvent as the aprotic solvent that may be used for production of the chemically modified fine fibers, such as dimethyl sulfoxide, for example.

The resin composite of this embodiment may also include other components, namely additives including fine fiber filler components composed of highly heat-resistant organic polymers other than chemically modified fine fibers (for example, fibrillated fibers fine fibers obtained from aramid fibers); compatibilizers; plasticizers; polysaccharides such as starch and alginic acid; natural proteins such as gelatin, nikawa and cascin; inorganic compounds such as zeolite, ceramics, talc, silica, metal oxides and metal powders; coloring agents; perfumes; pigments; flow adjusters; leveling agents; conductive agents; antistatic agents; ultraviolet absorbers; ultraviolet dispersing agents; and deodorants. The content ratio of optional additives in the resin composite is appropriately selected in a range that does not interfere with the desired effect of the invention, and for example, it may be 0.01 to 50 mass % or 0.1 to 30 mass %.

With chemically modified fine fibers in the resin composite, aggregation by hydrogen bonding will be reduced compared to unmodified fine cellulose fibers. Thus, in the mixing step for the chemically modified fine fibers and resin, aggregation between chemically modified fine fibers is minimized, the chemically modified fine fibers homogeneously disperse in the resin, and a fiber-reinforced resin complex containing chemically modified fine fibers can be obtained that has excellent dynamic properties, heat resistance, surface smoothness and outer appearance.

The resin composite containing chemically modified fine fibers according to this embodiment has a satisfactory balance for its mechanical properties, including its static properties in bending testing and dynamic properties in impact testing.

The resin used in the resin composite of this embodiment may be a thermoplastic resin, a thermosetting resin and/or a photocuring resin. The resin may also be an elastomer.

The content of the resin (matrix resin) in the resin composite may be 60 to 99.5 mass %, and more preferably 80 to 90 mass %. A resin content of 60 mass % or greater is effective for exhibiting thermal stability (lower linear coefficient of thermal expansion, and retaining elasticity at high temperature), while a resin content of 99.5 mass % or lower will allow functions such as a high clastic modulus and lower coefficient of thermal expansion to be imparted to the resin composite.

When the resin is a thermoplastic resin, the melting point of the thermoplastic resin may be appropriately selected depending on the purpose of use of the resin composite. For a resin with a relatively low melting point (such as a polyolefin-based resin), for example, the melting point of the thermoplastic resin may be 150° C. to 190° C. or 160° C. to 180° C., while for a resin with a relatively high melting point (such as a polyamide-based resin), for example, it may be 220° C. to 350° C. or 230° C. to 320° C.

The thermoplastic resin may be at least one type selected from the group consisting of polyolefin-based resins, polyacetate-based resins, polycarbonate-based resins, polyamide-based resins, polyester-based resins, polyphenylene ether-based resins and acrylic-based resins.

Polyolefin-based resins that are preferred as thermoplastic resins are polymers obtained by polymerizing olefins (such as α-olefins) and/or alkenes as monomer units. Specific examples of polyolefin-based resins include ethylene-based (co)polymers such as low-density polyethylene (for example, linear low-density polyethylene), high-density polyethylene, ultralow-density polyethylene and ultrahigh molecular weight polyethylene, polypropylene-based (co) polymers such as polypropylene, ethylene-propylene copolymer and ethylene-propylene-diene copolymer, and copolymers with α-olefins such as ethylene, including ethylene-acrylic acid copolymer, ethylene-methyl methacrylate copolymer and ethylene-glycidyl methacrylate copolymer.

The most preferred polyolefin-based resin is polypropylene. Particularly preferred is polypropylene, which has a melt mass-flow rate (MFR) of 3 g/10 min to 30 g/10 min, as measured at 230° C. with a load of 21.2 N, according to ISO1133. The lower limit for MFR is more preferably 5 g/10 min, even more preferably 6 g/10 min and most preferably 8 g/10 min. The upper limit for MFR is more preferably 25 g/10 min, even more preferably 20 g/10 min and most preferably 18 g/10 min. The MFR preferably is not above this upper limit from the viewpoint of increased toughness of the composition, and it is preferably not less than the lower limit from the viewpoint of the flow property of the composition.

An acid-modified polyolefin-based resin may also be suitably used in order to increase the affinity with cellulose. The acid may be appropriately selected from among maleic acid, fumaric acid, succinic acid, phthalic acid and their anhydrides, and polycarboxylic acids such as citric acid. Preferred among these are maleic acid or its anhydride, for an increased modification rate. While the modification method is not particularly restricted, a common method involves heating to above the melting point in the presence of or in the absence of a peroxide, for melt kneading. The polyolefin resin to be acid-modified may be any of the aforementioned polyolefin-based resins, but polypropylene is most suitable for use. The acid-modified polypropylene may be used alone, but it is preferably used in admixture with a non-modified polypropylene in order to adjust the modification rate of the entire resin. The proportion of acid-modified polypropylene with respect to the total polypropylene is 0.5 mass % to 50 mass %. The lower limit is more preferably 1 mass %, even more preferably 2 mass %, yet more preferably 3 mass %, even yet more preferably 4 mass % and most preferably 5 mass %. The upper limit is more preferably 45 mass %, even more preferably 40 mass %, yet more preferably 35 mass %, even yet more preferably 30 mass % and most preferably 20 mass %. In order to maintain interfacial strength between the resin and the cellulose it is preferably higher than the lower limit, and in order to maintain ductility as a resin it is preferably lower than the upper limit.

The melt mass-flow rate (MFR) of the acid-modified polypropylene as measured at 230° C. with a load of 21.2 N according to ISO1133 is preferably 50 g/10 min or higher, in order to increase affinity with the cellulose interface. A more preferred lower limit is 100 g/10 min, with 150 g/10 min being more preferred and 200 g/10 min being most preferred. There is no particular upper limit, and it may be 500 g/10 min in order to maintain mechanical strength. An MFR within this range will provide an advantage of residing more easily at the interface between the cellulose and the resin.

Examples of preferred polyamide-based resins for the thermoplastic resin include polyamides obtained by polycondensation reaction of lactams (such as polyamide 6, polyamide 11 and polyamide 12), and polyamides obtained by copolymerization of diamines (such as 1,6-hexanediamine, 2-methyl-1,5-pentanediamine, 1,7-heptanediamine, 2-methyl-1-6-hexanediamine, 1,8-octanediamine, 2-methyl-1,7-heptanediamine, 1,9-nonanediamine, 2-methyl-1,8-octanediamine, 1,10-decanediamine, 1,11-undecanediamine, 1,12-dodecanediamine and m-xylylenediamine) and dicarboxylic acids (such as butanedioic acid, pentanedioic acid, hexanedioic acid, heptanedioic acid, octanedioic acid, nonanedioic acid, decanedioic acid, benzene-1,2-dicarboxylic acid, benzene-1,3-dicarboxylic acid, benzene-1,4-dicarboxylic acid, cyclohexane-1,3-dicarboxylic acid and cyclohexane-1,4-dicarboxylic acid) (such as polyamide 6,6, polyamide 6,10, polyamide 6, 11, polyamide 6,12, polyamide 6, T, polyamide 6,I, polyamide 9,T, polyamide 10,T, polyamide 2M5,T, polyamide MXD, 6, polyamide 6,C and polyamide 2M5,C), as well as copolymers obtained by copolymerization of these (such as polyamide 6,T/6,I).

More preferred among these polyamide-based resins are aliphatic polyamides such as polyamide 6, polyamide 11, polyamide 12, polyamide 6,6, polyamide 6,10, polyamide 6, 11 and polyamide 6, 12, and alicyclic polyamides such as polyamide 6,C and polyamide 2M5,C.

For increased heat resistance of the resin composite, the melting point of the polyamide-based resin is preferably 220° C. or higher, more preferably 230° C. or higher, even more preferably 240° C. or higher, yet more preferably 245° C. or higher and most preferably 250° C. or higher, while from the viewpoint of easier production of the resin composite, the melting point is preferably no higher than 350° C., no higher than 320° C. or no higher than 300° C.

There are no particular restrictions on the terminal carboxyl group concentration of the polyamide-based resin, but the lower limit is preferably 20 μmol/g and more preferably 30 μmol/g. The upper limit for the terminal carboxyl group concentration is preferably 150 μmol/g, more preferably 100 μmol/g and even more preferably 80 μmol/g.

In the polyamide-based resin, the ratio of carboxyl terminal groups with respect to the total terminal groups ([COOH]/[total terminal groups]) is more preferably 0.30 to 0.95. The lower limit for the carboxyl terminal group ratio is more preferably 0.35, yet more preferably 0.40 and most preferably 0.45. The upper limit for the carboxyl terminal group ratio is more preferably 0.90, yet more preferably 0.85 and most preferably 0.80. The carboxyl terminal group ratio is preferably 0.30 or higher from the viewpoint of dispersibility of the chemically modified fine fibers in the resin composite, and preferably 0.95 or lower from the viewpoint of the color tone of the resulting resin composite.

The method used to adjust the terminal group concentration of the polyamide-based resin may be a publicly known method. For example, the method may be addition of a terminal group adjuster that reacts with the terminal groups, such as a diamine compound, monoamine compound, dicarboxylic acid compound, monocarboxylic acid compound, acid anhydride, monoisocyanate, monoacid halide, monoester or monoalcohol, to the polymerization solution, so as to result in the prescribed terminal group concentration during polymerization of the polyamide.

Examples of terminal group adjusters that react with terminal amino groups include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid and phenylacetic acid; and mixtures of any selected from among the foregoing. Among these, from the viewpoint of reactivity, stability of capped ends and cost, one or more terminal group adjusters selected from the group consisting of acetic acid, propionic acid, butyric acid, valeric acid, caproic acid, caprylic acid, lauric acid, tridecanoic acid, myristic acid, palmitic acid, stearic acid and benzoic acid are preferred, with acetic acid being most preferred.

Examples of terminal group adjusters that react with terminal carboxyl groups include aliphatic monoamines such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; aromatic monoamines such as aniline, toluidine, diphenylamine and naphthylamine; and any mixtures of the foregoing. Among these, from the viewpoint of reactivity, boiling point, capped end stability and cost, it is preferred to use one or more terminal group adjusters selected from the group consisting of butylamine, hexylamine, octylamine, decylamine, stearylamine, cyclohexylamine and aniline.

The concentration of the amino terminal groups and carboxyl terminal groups is preferably determined from the integral of the characteristic signal corresponding to each terminal group, according to $^1$H-NMR, from the viewpoint of precision and convenience. The recommended method for determining the terminal group concentration is, specifically, the method described in Japanese Unexamined Patent Publication HEI No. 7-228775. When this method is used, heavy trifluoroacetic acid is useful as the measuring solvent. Also, the number of scans in $^1$H-NMR must be at least 300, even with measurement using a device having sufficient resolving power. Alternatively, the terminal group concentration can be measured by a titration method such as described in Japanese Unexamined Patent Publication No. 2003-055549. However, in order to minimize the effects of the mixed additives and lubricant, quantitation is preferably by $^1$H-NMR.

The intrinsic viscosity [η] of the polyamide-based resin, measured in concentrated sulfuric acid at 30° C., is preferably 0.6 to 2.0 dL/g, more preferably 0.7 to 1.4 dL/g, even more preferably 0.7 to 1.2 dL/g and most preferably 0.7 to 1.0 dL/g. If the aforementioned polyamide having intrinsic viscosity in the preferred range, or the particularly preferred range, is used, it will be possible to provide an effect of drastically increasing the flow property of the resin composite in the die during injection molding, and improving the outer appearance of molded pieces.

Throughout the present disclosure, "intrinsic viscosity" is synonymous with the viscosity commonly known as the limiting viscosity. The specific method for determining the viscosity is a method in which the ηsp/c of several measuring solvents with different concentrations is measured in 96% concentrated sulfuric acid under temperature conditions of 30° C., the relational expression between each ηsp/c and the concentration (c) is derived, and the concentration is extrapolated to zero. The value extrapolated to zero is the intrinsic viscosity.

The details are described in Polymer Process Engineering (Prentice-Hall, Inc 1994), p. 291-294.

The number of measuring solvents with different concentrations is preferably at least 4, from the viewpoint of precision. The concentrations of the recommended measuring solutions with different viscosities are preferably at least four: 0.05 g/dL, 0.1 g/dL, 0.2 g/dL and 0.4 g/dL.

Polyester-based resins that are preferred as thermoplastic resins are one or more selected from among polyethylene terephthalate (hereunder also referred to simply as "PET"), polybutylene succinate (a polyester resin composed of an aliphatic polybasic carboxylic acid and an aliphatic polyol (hereunder also referred to simply as "unit PBS")), polybutylene succinate adipate (hereunder also referred to simply as "PBSA"), polybutylene adipate terephthalate (hereunder also referred to simply as "PBAT"), polyhydroxyalkanoic acids (polyester resins composed of 3-hydroxyalkanoic acids, hereunder also referred to simply as "PHA"), polylactic acid (hereunder also referred to simply as "PLA"), polybutylene terephthalate (hereunder also referred to simply as "PBT"), polyethylene naphthalate (hereunder also referred to simply as "PEN") and polyallylates (hereunder also referred to simply as "PAR").

Preferred polyester-based resins among these include PET, PBS, PBSA, PBT and PEN, with PBS, PBSA and PBT being more preferred.

The terminal groups of the polyester-based resin can be freely altered by the monomer ratio during polymerization and/or by the presence or absence and amount of stabilizer at the ends, and more preferably the ratio of carboxyl terminal groups with respect to the total terminal groups of the polyester-based resin ([COOH]/[total terminal groups]) is 0.30 to 0.95. The lower limit for the carboxyl terminal group ratio is more preferably 0.35, yet more preferably 0.40 and most preferably 0.45. The upper limit for the carboxyl terminal group ratio is more preferably 0.90, yet more preferably 0.85 and most preferably 0.80. The carboxyl terminal group ratio is preferably 0.30 or greater from the viewpoint of dispersibility of the microcellulose in the composition, and it is preferably no greater than 0.95 from the viewpoint of the color tone of the obtained composition.

Polyacetal-based resins preferred as thermoplastic resins are commonly homopolyacetals obtained from formaldehyde starting materials and copolyacetals with trioxane as the main monomer and comprising 1,3-dioxolane as a comonomer component, and although both of these may be used, copolyacetals are preferably used from the viewpoint of thermal stability during working. The percentage of structure due to the comonomer component (for example, 1,3-dioxolane) is more preferably in the range of 0.01 to 4 mol %. The preferred lower limit for the percentage of structure due to the comonomer component is 0.05 mol %, more preferably 0.1 mol % and even more preferably 0.2 mol %. The preferred upper limit is 3.5 mol %, more preferably 3.0 mol %, even more preferably 2.5 mol % and most preferably 2.3 mol %. The lower limit is preferably in the range specified above from the viewpoint of thermal stability during extrusion and during molding, and the upper limit is preferably in the range specified above from the viewpoint of mechanical strength.

Specific examples of thermosetting resins include, but are not particularly limited to, bisphenol-type epoxy resins such as bisphenol A-type epoxy resin, bisphenol F-type epoxy resin, bisphenol S-type epoxy resin, bisphenol E-type epoxy resin, bisphenol M-type epoxy resin, bisphenol P-type epoxy resin and bisphenol Z-type epoxy resin, novolac-type epoxy resins such as bisphenol A-novolac-type epoxy resin, phenol-novolac-type epoxy resin and cresol-novolac-epoxy resin, biphenyl-type epoxy resins, biphenylaralkyl-type epoxy resins, arylalkylene-type epoxy resins, tetraphenylolethane-type epoxy resins, naphthalene-type epoxy resins, anthracene-type epoxy resins, phenoxy-type epoxy resins, dicyclopentadiene-type epoxy resins, norbornane-type epoxy resins, adamantane-type epoxy resins, fluorene-type epoxy resins, glycidyl methacrylate copolymer-based epoxy resins, cyclohexylmaleimide and glycidyl methacrylate copolymer epoxy resins, epoxy-modified polybutadiene rubber derivatives, CTBN-modified epoxy resins, trimethylolpropane polyglycidyl ether, phenyl-1,3-diglycidyl ether, biphenyl-4,4'-diglycidyl ether, 1,6-hexanediol diglycidyl ether, diglycidyl ethers of ethylene glycol or propylene glycol, sorbitol polyglycidyl ether, tris(2,3-epoxypropyl) isocyanurate, triglycidyltris(2-hydroxyethyl) isocyanurate, phenol resins, including novolac-type phenol resins such as phenol-novolac resin, cresol-novolac resin and bisphenol A-novolac resin, resol-type phenol resins such as modified resol phenol resins, oil-modified resol phenol resins modified with China wood oil, linseed oil or walnut oil, phenoxy resins, urea resins, triazine ring-containing resins such as melamine resins, unsaturated polyester resins, bismaleimide resins, diallyl phthalate resins, silicone resins, benzoxazine ring-containing resins, norbornane-based resins, cyanate resins, isocyanate resins, urethane resins, benzocyclobutene resins, maleimide resins, bismaleimidetriazine resins, polyazomethine resins, and thermosetting polyimides.

These thermosetting resins may be used alone, or two or more different types may be used as blends. For a blend, the blend ratio may be appropriately set depending on the particular use.

Specific examples of photocuring resins include, but are not particularly limited to, common publicly known (meth) acrylate resins, vinyl resins and epoxy resins. These are largely classified depending on the reaction mechanism, either as radical reactive types wherein a monomer reacts by radicals generated from light, or cation reactive types wherein a monomer undergoes cationic polymerization. Radical reactive monomers include (meth)acrylate compounds and vinyl compounds (such as certain types of vinyl ethers). Cation reactive types include epoxy compounds, and certain types of vinyl ethers. For example, an epoxy compound that can be used as a cation reactive type can serve as a monomer for both thermosetting resins and photocuring resins.

A (meth)acrylate compound is a compound having at least one (meth)acrylate group in the molecule. Specific examples of (meth)acrylate compounds include monofunctional (meth)acrylates, polyfunctional (meth)acrylates, epoxy acrylates, polyester acrylates, and urethane acrylates.

Vinyl compounds include vinyl ethers, styrene and styrene derivatives, and vinyl compounds. Vinyl ethers include ethylvinyl ether, propylvinyl ether, hydroxyethylvinyl ether and ethyleneglycol divinyl ether. Styrene derivatives include methylstyrene and ethylstyrene. Vinyl compounds include triallyl isocyanurate and trimethallyl isocyanurate.

Reactive oligomers may also be used as photocuring resin starting materials. Reactive oligomers include oligomers having any combination selected from among (meth)acrylate groups, epoxy groups, urethane bonds and ester bonds in the same molecule, examples of which are a urethane acrylate having a (meth)acrylate group and urethane bond in the same molecule, a polyester acrylate having a (meth) acrylate group and an ester bond in the same molecule, and an epoxy acrylate derived from an epoxy resin and having an epoxy group and a (meth)acrylate group in the same molecule.

These photocuring resins may be used alone, or two or more different types may be used as blends. For a blend, the blend ratio may be appropriately set depending on the particular use.

Elastomer (Rubber)

Specific examples of elastomers (rubbers) include, but are not particularly limited to, natural rubber (NR), butadiene rubber (BR), styrene-butadiene copolymer rubber (SBR), isoprene rubber (IR), butyl rubber (IIR), acrylonitrile-butadiene rubber (NBR), acrylonitrile-styrene-butadiene copolymer rubber, chloroprene rubber, styrene-isoprene copolymer rubber, styrene-isoprene-butadiene copolymer rubber, isoprene-butadiene copolymer rubber, chlorosulfonated polyethylene rubber, modified natural rubber (such as epoxidated natural rubber (ENR), natural hydride rubber and deproteinized natural rubber), ethylene-propylene copolymer rubber, acrylic rubber, epichlorohydrin rubber, polysulfide rubber, silicone rubber, fluorine rubber and urethane rubber. These rubber materials may be used alone, or two or more different types may be used as blends. For a blend, the blend ratio may be appropriately set depending on the particular use.

The resin composite of this embodiment can be produced by mixing the chemically modified fine fibers with a base resin, and carrying out heat-fusion kneading, thermosetting, photocuring and curing. A molded article may also be fabricated by casting the resin composite. The form in which the chemically modified fine fibers are added during production of the resin composite is not particularly restricted, and it may be as a slurry containing not only the dry powder but also water. Water-containing slurry can be prepared by a method of halting drying during the drying procedure in the method for producing the chemically modified fine fibers, or a method of adding water after first drying.

According to one aspect, the method for producing a resin composite when the resin is a thermoplastic resin includes a step of kneading the chemically modified fine fibers in the form of dry powder or an aqueous dispersion inside a melt kneading molding machine, together with the thermoplastic resin, and then casting the kneaded mixture.

According to another aspect, the method for producing the resin composite when the resin is a thermosetting resin or photocuring resin includes a step of mixing the chemically modified fine fibers and a thermosetting resin and then casting the mixture and subjecting it to thermosetting treatment, or a step of mixing the chemically modified fine fibers and a photocuring resin and then casting the mixture and subjecting it to photocuring treatment.

According to yet another aspect, the method for producing the resin composite when the resin is an elastomer includes a step of mixing the chemically modified fine fibers with a rubber starting material and then casting the mixture and subsequently vulcanizing it. The method of mixing the chemically modified fine fibers and the rubber starting material may be a method of kneading with a kneader such as a bench roll, Banbury mixer, kneader or planetary mixer;

a method of mixing with a stirring blade; or a method of mixing with a revolving or rotating stirrer.

More specific methods for producing the resin composite when the resin is a thermoplastic resin include, but are not limited to:

1. A method of using a single-screw or twin-screw extruder for melt kneading of a mixture of the chemically modified fine fibers (dry powder or aqueous dispersion) and a thermoplastic resin, followed by:
   (1) extrusion into a strand form and cooling solidification in a water bath to obtain molded pellets of the resin composite,
   (2) extrusion and cooling into a rod or tubular form to obtain an extruded body of the resin composite, or
   (3) extrusion with a T-die to obtain a molded sheet or film of the resin composite, or
2. A method of mixing the chemically modified fine fibers (dry powder or aqueous dispersion) with a thermoplastic resin monomer and conducting polymerization reaction (specifically, solid-phase polymerization, emulsion polymerization, suspension polymerization, solution polymerization or bulk polymerization), and extruding the obtained product by the method of any one of (1) to (3) above, to obtain a molded resin composite.

When the resin is a thermoplastic resin, the minimum processing temperature recommended by the supplier of the thermoplastic resin is 255 to 270° C. for polyamide 66, 225 to 240° C. for polyamide 6, 170° C. to 190° C. for a polyacetal resin and 160 to 180° C. for polypropylene. The heating preset temperature is preferably in a range of 20° C. higher than the recommended minimum processing temperature. Setting the mixing temperature to within this range will allow the chemically modified fine fibers and the resin to be uniformly mixed.

The moisture content of the resin composite is not particularly restricted, but for a polyamide, for example, it is preferably 10 ppm or greater to inhibit increase in molecular weight of the polyamide during melting, while it is also preferably 1200 ppm or lower, more preferably 900 ppm or lower and most preferably 700 ppm or lower to inhibit hydrolysis of the polyamide during melting. The moisture content is the value measured using a Karl Fischer moisture meter by the method of ISO 15512.

A resin composite with a thermoplastic resin as the resin can be utilized for various types of molded resins. The method for producing the molded resin is not particularly restricted and any production method may be employed, but the molded resin can be produced in the form of a sheet, film or fibers by injection molding (injection compression molding, injection press molding or gas assist injection molding), as well as by various types of extrusion (cold runner method or hot runner method), foam molding (including methods involving injection of supercritical fluids), insert molding, in-mold coating molding, insulated die molding, rapid-heating/cooling die molding, profile extrusion methods (two-color molding, sandwich molding, and injection molding such as ultra high-speed injection molding), or various types of extrusion molding methods. Inflation methods, calender methods and casting methods may also be used for molding into a sheet or film. Molding into a heat contracted tube is also possible by using a specific stretching operation. Blow molding products can also be obtained by rotational molding or blow molding. Injection molding is most preferred among these from the viewpoint of design and cost.

The resin composite of this embodiment may be provided in a variety of different forms. Specifically, resin pellets, sheet forms, fibrous forms, tabular forms and rod forms may be mentioned. Resin pellets are more preferred among these for easier post-processing and facilitated transport. Preferred pellet forms are round, elliptical or circular columnar. The form of the pellets can be varied by the cutting method used during extrusion. Pellets cut by the method known as "underwater cutting" are usually round, pellets cut by the method known as "hot cutting" are usually round or elliptical, and pellets cut by the method known as "strand cutting" are usually cylindrical. The preferred size for round pellets is 1 mm to 3 mm, as the diameter of the pellets. The preferred diameter for cylindrical pellets is 1 mm to 3 mm, and the preferred length is 2 mm to 10 mm. The diameter and length are preferably above these specified lower limits from the viewpoint of operational stability during extrusion, and they are preferably lower than the specified upper limits from the viewpoint of seizing in the molding machine in post-working.

The method for producing a resin composite when the resin is a thermosetting resin or photocuring resin is not particularly restricted, and examples include methods of adequately dispersing the chemically modified fine fibers in a resin solution or resin powder dispersion and drying them, methods of adequately dispersing the chemically modified fine fibers in a resin monomer solution and polymerizing them with heat, UV irradiation or a polymerization initiator, methods of adequately impregnating a molded article (such as a sheet or molded particle powder) of the chemically modified fine fibers with a resin solution or resin powder dispersion and drying it, and methods of adequately impregnating a molded article of the chemically modified fine fibers with a resin monomer solution and polymerizing it with heat, UV irradiation or a polymerization initiator. Any of various polymerization initiators, curing agents, curing accelerators and polymerization inhibitors may be added during curing.

A resin composite with a thermosetting resin or photocuring resin as the resin can be utilized for various types of molded resins. The method of producing the molded resin is not particularly restricted, and any of various production methods may be used.

In the case of a thermosetting resin, extrusion molding is commonly used for production of tabular products, but flat pressing may also be employed. A profile extrusion method, blow molding method, compression molding method, vacuum forming method or injection molding may also be used. Melt extrusion or solution casting methods may be used for production of a film-like product, and when a melt method is used, it may be inflation film molding, cast molding, extrusion lamination molding, calender molding, sheet forming, fiber molding, blow molding, injection molding, rotational molding or cover molding.

After fabricating a sheet, known as the uncured or semi-cured prepreg, the prepreg may be used as a single layer or laminated, and pressed and heated for curing and molding of the resin. Methods of applying heat and pressure include press molding, autoclave molding, bagging molding, wrapping tape and internal pressure molding methods, with no limitation to these molding methods.

Methods of impregnating filaments or a preform of reinforcing fibers such as carbon fibers with the resin composite before resin curing, and then curing the resin to obtain a molded article (such as RTM, VaRTM, filament winding, RFI or similar molding methods) may also be used.

When the resin is a photocuring resin, the molded article may be produced using any of various curing methods that make use of an active energy beam.

The method of producing the resin composite when the resin is an elastomer, is not particularly restricted, and examples include a method of dry kneading the chemically modified fine fibers and rubber starting material, and a method of dispersing or dissolving the chemically modified fine fibers and rubber starting material in a dispersing medium and then drying and kneading. The mixing method used is preferably one using a homogenizer, from the viewpoint of applying high shearing force and pressure to accelerate dispersion, but other methods using a propeller-type stirrer, rotary stirrer, electromagnetic stirrer or manual stirring may also be used. The obtained resin composite may be molded into the desired shape and used as a molding material. The form of the molding material may be a sheet, pellets or powder.

A resin composite using an elastomer as the resin can be utilized for various types of molded resins. The method of producing the molded resin is not particularly restricted, and any of various production methods may be used. The molding material may be molded by a desired molding method such as die molding, injection molding, extrusion molding, blow molding or foam molding to obtain an unvulcanized molded article of the desired shape. The unvulcanized molded article may then be vulcanized by heat treatment as necessary.

The molded article obtained from the resin composite of this embodiment may be in any form depending on the purpose, such as a three-dimensional shape, or a sheet, film or fibrous form. A portion (for example, several locations) of the molded article may also be melted by heat treatment and adhered onto a resin or metal substrate. The molded article may also be a coated film coated onto a resin or metal substrate, being formed as a laminated body with the substrate. A molded article in a sheet, film or fibrous form may also be subjected to secondary processing such as annealing treatment, etching treatment, corona treatment, plasma treatment, texture transfer, cutting or surface-polishing.

In the mixing step for the chemically modified fine fibers and resin, aggregation between chemically modified fine fibers does not occur and the chemically modified fine fibers homogeneously disperse in the resin, and therefore a resin composite and molded article containing chemically modified fine fibers can be obtained that has excellent dynamic properties, heat resistance, dimensional stability, surface smoothness and outer appearance. In addition, with the resin composite of this embodiment it is possible to obtain a satisfactory balance for the mechanical properties, including static properties in bending testing and dynamic properties in impact testing. In terms of the heat resistance of the resin composite, the deflection temperature under load can be increased by several tens of degrees Celsius. With a molded article that is the final molded product obtained from the resin composite, the chemically modified fine fibers do not form aggregated masses, and therefore the surface smoothness and outer appearance are excellent.

In terms of the dimensional stability, in particular, when evaluation is conducted based on the linear coefficient of thermal expansion (CTE), it is preferably 80 ppm/k or smaller, more preferably 70 ppm/k or smaller, even more preferably 60 ppm/k or smaller, yet more preferably 55 ppm/k or smaller and most preferably 50 ppm/k or smaller, for the resin composite of this embodiment.

In terms of the flexural modulus and flexural strength, the proportion of increase in the flexural modulus of the resin composite of this embodiment, when evaluated as the proportion of increase with respect to the resin containing no filler component (that is, the chemically modified fine fibers and other fillers) is preferably 1.3 or higher, more preferably 1.4 or higher, even more preferably 1.5 or higher, yet more preferably 1.6 or higher and most preferably 1.7 or higher. The proportion of increase in the flexural strength of the resin composite of this embodiment is preferably 1.3 or higher, more preferably 1.4 or higher, even more preferably 1.5 or higher and most preferably 1.6 or higher.

In terms of the storage modulus, the proportion of increase in the storage modulus of the resin composite of this embodiment, when evaluated as the proportion of increase with respect to the resin containing no filler component (that is, the chemically modified fine fibers and other fillers) is preferably 1.3 or higher, more preferably 1.4 or higher, even more preferably 1.5 or higher, yet more preferably 1.6 or higher and most preferably 1.7 or higher. The proportion of increase in the storage modulus of the resin composite of this embodiment is preferably 1.3 or higher, more preferably 1.4 or higher, even more preferably 1.5 or higher and most preferably 1.6 or higher.

Second Embodiment

The second embodiment, as one aspect of the invention, provides chemically modified fine cellulose fibers wherein the weight-average molecular weight (Mw) is 100,000 or greater, and the ratio (Mw/Mn) of the weight-average molecular weight (Mw) and number-average molecular weight (Mn) is 6 or lower. As mentioned above for the first embodiment, since the ends of the cellulose molecules act as origins for thermal decomposition, a high weight-average molecular weight also results in a narrower molecular weight distribution, resulting in fine cellulose fibers, as well as a resin composite containing the fine cellulose fibers and resin, with high heat resistance.

According to one aspect, the chemically modified fine fibers of the second embodiment have an alkali-soluble content of 12 mass % or lower.

According to one aspect, the chemically modified fine fibers of the second embodiment have a thermal decomposition initiation temperature ($T_D$) of 270° C. or higher, a number-average fiber diameter of 10 nm or greater and less than 1 μm, and/or a degree of crystallinity of 60% or higher. The chemically modified fine fibers of the second embodiment preferably have at least one, at least two, at least three, or at least four, of the following properties: being esterified fine cellulose fibers; having an average degree of substitution of hydroxyl groups of 0.5 or greater; having a mean content for the acid-insoluble component per unit specific surface area of 1.0 mass %·g/m$^2$ or lower; and having a coefficient of variation (CV) for the DS non-uniformity ratio (DSs/DSt), as the ratio of the degree of modification (DSs) of the fiber surface with respect to the degree of modification (DSt) of the entire fibers, of 50% or lower. The other aspects of the chemically modified fine fibers of the second embodiment are the same as the preferred aspects for the chemically modified fine fibers of the first embodiment explained above.

The second embodiment provides a method for producing chemically modified fine cellulose fibers, which includes:

defibrating a cellulose starting material having a weight-average molecular weight (Mw) of 100,000 or greater, a ratio (Mw/Mn) of weight-average molecular weight (Mw) and number-average molecular weight (Mn) of 6 or lower and an alkali-soluble content of 12 mass % or lower, in a dispersion that includes an aprotic solvent, to obtain fine cellulose fibers, and adding a modifying agent-containing solution to the dispersion to modify the fine cellulose fibers, thereby obtaining chemically modified fine cellulose fibers having a weight-average molecular weight (Mw) of 100,000 or greater, a ratio (Mw/Mn) of weight-average molecular weight (Mw) and number-average molecular weight (Mn) of 6 or lower, an alkali-soluble content of 12 mass % or lower and a degree of crystallinity of 60% or higher. According to one aspect, the chemically modified fine cellulose fibers obtained by this method have a thermal decomposition initiation temperature ($T_D$) of 270° C. or higher and a number-average fiber diameter of 10 nm or greater and less than 1 μm. According to another aspect, the aprotic solvent is dimethyl sulfoxide, and the modifying agent is vinyl acetate or acetic anhydride. Examples of preferred aspects for defibrating and modification are the same as explained for the first embodiment.

The second embodiment also provides a resin composite containing the chemically modified fine cellulose fibers and resin, and a method for producing it. Examples of preferred aspects for the resin composite, its constituent components and the method for producing the resin composite, are the same as explained for the first embodiment.

Third Embodiment

The third embodiment, as one aspect of the invention, provides:

a resin composite containing 0.5 to 40 mass % of chemically modified fine cellulose fibers and a resin, wherein the DS non-uniformity ratio (DSs/DSt), as the ratio of the degree of modification (DSs) of the fiber surfaces with respect to the degree of modification (DSt) of the entire chemically modified fine cellulose fibers, is 1.1 or greater, and the coefficient of variation (CV) of the DS non-uniformity ratio (DSs/DSt) is 50% or lower.

The third embodiment also provides:

a method for producing a resin composite containing 0.5 to 40 mass % of chemically modified fine cellulose fibers, and a resin, wherein the method includes:

a defibrating step in which a cellulose starting material is defibrated in a dispersion that includes the cellulose starting material and an aprotic solvent but essentially does not include an ionic liquid or sulfuric acid, to obtain fine cellulose fibers, a modifying step in which a solution that includes a modifying agent is added to the dispersion for chemical modification of the fine cellulose fibers, to obtain chemically modified fine cellulose fibers, and a kneading step in which the chemically modified fine cellulose fibers and the resin are kneaded, the DS non-uniformity ratio (DSs/DSt), as the ratio of the degree of modification (DSs) of the fiber surfaces with respect to the degree of modification (DSt) of the entire chemically modified fine cellulose fibers, is 1.1 or greater, and the coefficient of variation (CV) of the DS non-uniformity ratio (DSs/DSt) is 50% or lower.

This method is advantageous for producing a resin composite containing chemically modified fine fibers having a thermal decomposition initiation temperature ($T_D$) of 270° C. or higher, a number-average fiber diameter of 10 nm or greater and less than 1 μm and a degree of crystallinity of 60% or higher, and a resin.

The other aspects of the resin composite and method for producing it according to the third embodiment are the same as the preferred aspects mentioned above for the resin composite and method for producing it according to the first embodiment.

Uses of Resin Composite

Because the resin composite of this embodiment has high heat resistance and light weight, it can substitute for steel sheets, or for fiber-reinforced plastics such as carbon fiber reinforced plastics or glass fiber reinforced plastics, or for inorganic filler-containing resin composites. For example, it can serve as a material for industrial machinery parts (for example, electromagnetic device housings, roll materials, transport arms or medical equipment members), common machine parts, automobile/railway/vehicle parts (for example, outer platings, chassis, aerodynamic members, seats or friction materials for transmission interiors), ship members (for example, hulls or seats), aviation-related parts (for example, fuselages, wings, tail units, moving vanes, fairings, cowls, doors, seats or interior finishing materials), spacecraft, artificial satellite members (motor cases, wings, body frames or antennae), electronic and electrical components (for example, personal computer cases, cellular phone cases, OA devices, AV devices, telephone sets, facsimiles, household electrical appliances, toy parts or printed circuit boards), construction and civil engineering materials (for example, reinforcing steel substitute materials, truss structures or suspension bridge cables), subsistence items, sports and leisure goods (for example, golf club shafts, fishing rods or tennis and badminton rackets), and wind power generation housing members, as well as members of containers and packings, including high-pressure containers filled with hydrogen gas or the like to be used for fuel cells.

Preferred among these are members that can exhibit superiority through higher heat resistance compared to existing resin composites (i.e. members necessary for resin molding). From this viewpoint, automobile members comprising the resin composite of this embodiment and electronic product members comprising the resin composite of this embodiment are preferred.

EXAMPLES

The present invention will now be explained in more specific detail through examples, with the understanding that the scope of the invention is in no way limited to the examples.

Example I: First Embodiment

Production Example 1-1 (Fabrication of Chemically Modified Fine Fibers 1-1)

Using 210 g of filter paper 5A (FILTER PAPER by Advantec Corp.) (mean content for acid-insoluble component: ≤0.2 mass %, alkali-soluble portion content: 10.1 mass %) as the starting material for chemically modified fine fibers, it was stirred in 5 kg of dimethyl sulfoxide (DMSO) at 500 rpm for 1 hour at ordinary temperature, using a uniaxial stirrer (DKV-1 φ125 mm dissolver by Aimex Co.). The mixture was then fed to a bead mill (NVM-1.5 by Aimex Co.) using a hose pump and circulated for 120 minutes with DMSO alone, to obtain 5.2 kg of defibrated slurry (defibrating step). Also, 572 g of vinyl acetate and 85 g of sodium hydrogencarbonate were added into the bead mill, and then the mixture was further circulated for 60 minutes to obtain a defibrated modified slurry (defibrating/acetylating step).

During the circulation, the rotational speed of the bead mill was 2500 rpm and the circumferential speed was 12 m/s, while the beads used were made of zirconia with a size of Φ2.0 mm and the fill factor was 70% (the slit gap of the bead mill was 0.6 mm). During the circulation, the slurry temperature was controlled to 40° C. with a chiller, for absorption of the heat release by abrasion.

After then adding 10 L of purified water to the obtained defibrated and modified slurry and thoroughly stirring, it was placed in a dehydrator and concentrated. The obtained wet cake was then re-dispersed in 10 L of purified water and stirred and concentrated, and this rinsing procedure was repeated a total of 5 times to remove the unreacted reagent solvent. The finally obtained aqueous dispersion of chemically modified fine fibers 1-1 (solid content: 10 mass %) was vacuum dried at about 40° C. using a revolving/rotating stirrer (V-mini300 by EME Co.) to obtain chemically modified fine fibers 1-1.

Figure 3:
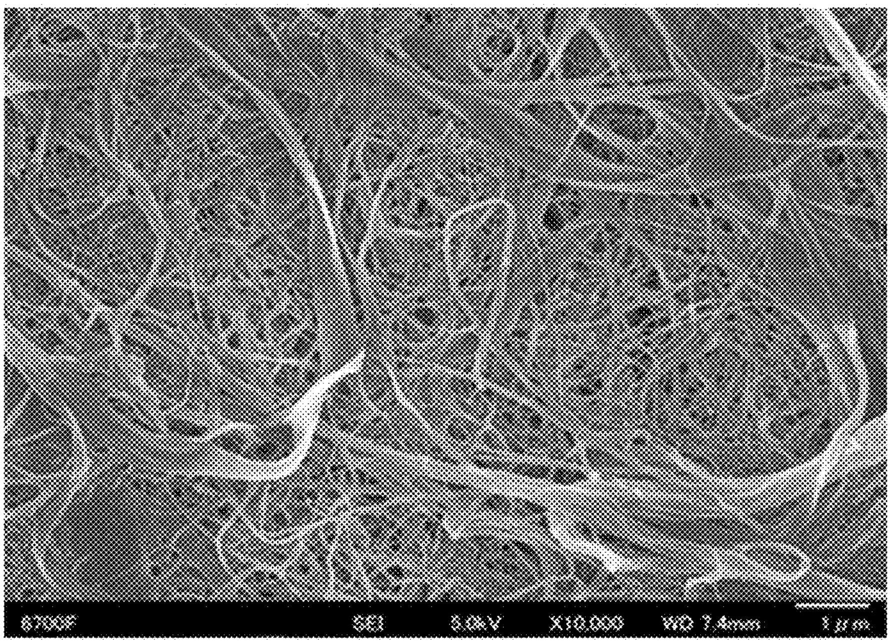
FIG. 3 is a SEM image of the chemically modified fine fibers 1-1 obtained in Production Example 1-1 of Example I.

FIG. 3 shows a SEM image (magnification: 10,000×) of a porous sheet fabricated by the method described below for the chemically modified fine fibers 1-1.

Production Example 1-2 (Fabrication of Chemically Modified Fine Fibers 1-2)

Chemically modified fine fibers 1-2 were obtained in the same manner as Production Example 1-1, except for using linter pulp as the starting material, and vacuum drying an aqueous dispersion of the obtained chemically modified fine fibers 1-2 (solid content: 10 mass %) at 40° C. using a revolving/rotating stirrer.

Production Example 1-3 (Fabrication of Chemically Modified Fine Fibers 1-3)

The same method was used as in Production Example 1-2 up to the defibrating step, except for using the same linter pulp as Production Example 1-1 as the starting material, to obtain 5.2 kg of a defibrated slurry (defibrating step). The obtained defibrated slurry was loaded into an explosion-proof disperser tank, after which 572 g of vinyl acetate and 85 g of sodium hydrogencarbonate were added, the internal temperature of the tank was brought to 40° C., and stirring was carried out for 120 minutes. The obtained slurry was dispersed and stirred in 10 L of purified water, and then concentrated with a dehydrator. The obtained wet cake was then re-dispersed in 10 L of purified water and stirred and concentrated, and this rinsing procedure was repeated a total of 5 times to remove the unreacted reagent solvent. Finally, the rinsed slurry (solid content: 10 mass %) was vacuum dried at 40° C. using the revolving/rotating stirrer mentioned above, to obtain chemically modified fine fibers 1-3.

Production Example 1-4 (Fabrication of Chemically Modified Fine Fibers 1-4)

Chemically modified fine fibers 1-4 were obtained in the same manner as Production Example 1-3, except that the stirring time in the explosion-proof disperser tank was 20 minutes.

Production Example 1-5 (Fabrication of Chemically Modified Fine Fibers 1-5)

Chemically modified fine fibers 1-5 were obtained in the same manner as Production Example 1-3, except that the stirring time in the explosion-proof disperser tank was 240 minutes.

Production Example 1-6 (Fabrication of Chemically Modified Fine Fibers 1-6)

After dispersing 4.5 kg of the same linter pulp as Production Example 1-2 in 300 L of purified water, the dispersion was stirred for approximately 30 minutes in a disperser tank, and then the slurry was beaten for 30 minutes using a disc refiner with the disc blade gap set to about 1 mm, and further beaten for 120 minutes with the disc blade gap set to 0.1 mm, to obtain a beaten slurry. The obtained beaten slurry was then treated with a high-pressure homogenizer (corresponding to 10 Pass with an operating pressure of 100 MPa), to obtain a CNF slurry (concentration: 1.5 mass %) with a number-average fiber diameter of about 75 nm. In order to replace the solvent of the CNF slurry from water to dimethylformamide, the CNF slurry was concentrated to a solid content of 10 mass % or greater with a dehydrator, after which the concentrated slurry was loaded into 300 L of dimethylformamide that had been loaded into an explosion-proof disperser tank, and after stirring for 20 minutes, it was concentrated with a dehydrator to a solid content of 10 mass % or greater. After carrying out this procedure two more times, the re-concentrated slurry was loaded into 150 L of dimethylformamide in the explosion-proof disperser tank and stirred for 30 minutes, after which 15 Kg of acetic anhydride and 5 kg of pyridine were loaded in, the internal temperature of the tank was brought to 30° C., and stirring was conducted for 120 minutes. The obtained slurry was dispersed and stirred in 10 L of purified water, and then concentrated with a dehydrator. The obtained wet cake was then re-dispersed in 10 L of purified water and stirred and concentrated, and this rinsing procedure was repeated a total of 5 times to remove the unreacted reagent solvent. The rinsing procedure was repeated 3 times, and the obtained aqueous dispersion of chemically modified fine fibers 1-4 (solid content: 10 mass %) was vacuum dried at 40° C. using the revolving/rotating stirrer mentioned above to produce chemically modified fine fibers 1-6.

Production Example 1-7 (Fabrication of Non-Chemically-Modified Fine Fibers 1-1)

CELISH KY-100G by Daicel Co. used as non-chemically-modified fine cellulose fibers were vacuum dried at 40° C. using the revolving/rotating stirrer mentioned above, to prepare fine fibers 1-1.

Production Example 1-8 (Fabrication of Chemically Modified Fine Fibers 1-7)

After placing 50 g of filter paper 5A (FILTER PAPER by Advantec) in a 1000 ml flask, and further adding 300 g of N,N-dimethylacetamide and 300 g of ionic liquid 1-butyl-3-methylimidazolium chloride, the mixture was stirred. Next, 270 g of acetic anhydride was added and reacted, after which the mixture was filtered and the solid content was rinsed. After treatment with a homogenizer, the rinsed slurry (solid content: 10 mass %) was finally vacuum dried at 40°

C. using the revolving/rotating stirrer mentioned above, to prepare chemically modified fine fibers 1-7.

Example 1-1 (Fabrication of Resin Composite 1-1)

Upon adding 2 parts by mass of the obtained chemically modified fine fibers 1-1 and 98 parts by mass of polyamide 66 resin (hereunder referred to simply as "PA66") (A226 by Unitika, Ltd.), a mini kneader ("Xplore", product name of Xplore Instruments) was used for circulated kneading for 5 minutes at 260° C., 100 rpm (shear rate: 1570 (1/s)), after which it was passed through a die to obtain a φ1 mm strand of resin composite 1-1. Resin composite pellets obtained from the strand (after cutting the strand to 1 cm lengths) were melted at 260° C. with an accessory injection molding machine, and the resin was used to form a dumbbell-shaped test piece conforming to JIS K7127, which was used for evaluations.

Example 1-2 (Fabrication of Resin Composite 1-2)

Resin composite 1-2 was obtained in the same manner as Example 1-1, except that the amount of chemically modified fine fibers 1-1 was changed to 4 parts by mass and the amount of PA66 was changed to 96 parts by mass.

Example 1-3 (Fabrication of Resin Composite 1-3)

Resin composite 1-3 was obtained in the same manner as Example 1-1, except that the amount of chemically modified fine fibers 1-1 was changed to 8 parts by mass and the amount of PA66 was changed to 92 parts by mass.

Example 1-4 (Fabrication of Resin Composite 1-4)

Resin composite 1-4 was obtained in the same manner as Example 1-2, except that the fine fibers were changed to chemically modified fine fibers 1-2.

Example 1-5 (Fabrication of Resin Composite 1-5)

Resin composite 1-5 was obtained in the same manner as Example 1-2, except that the PA66 of Example 1-2 was changed to acrylonitrile-butadiene rubber (DN003 by Zeon Corp.) (hereunder referred to simply as "NBR"), and the kneading temperature in the mini kneader and the molding temperature in the injection molding machine were changed to 50° C.

Example 1-6 (Fabrication of Resin Composite 1-6)

Resin composite 1-6 was obtained in the same manner as Example 1-2, except that the PA66 of Example 1-2 was changed to PA6 (1013B by Ube Industries, Ltd.) (hereunder referred to simply as "PA6"), and the kneading temperature in the mini kneader and the molding temperature in the injection molding machine were changed to 240° C.

Example 1-7 (Fabrication of Resin Composite 1-7)

Resin composite 1-7 in the form of a dumbbell-shaped test piece was obtained in the same manner as Example 1-1, except that the chemically modified fine fibers 1-1 of Example 1-1 were changed to 4 parts by mass of chemically modified fine fibers 1-3, the PA66 was changed to 96 parts by mass of a polypropylene resin (Prime Polypro J105G by Prime Polymer Co., Ltd.) (hereunder referred to simply as "PP"), and the kneading temperature in the mini kneader and the molding temperature in the injection molding machine were changed to 160° C.

Example 1-8 (Fabrication of Resin Composite 1-8)

Resin composite 1-8 in the form of a dumbbell-shaped test piece was obtained in the same manner as Example 1-1, using a solid mixture (dispersion) (5 parts by mass) of the chemically modified fine fibers 1-3 and polyoxyethylene hardened castor oil ether obtained by adding 1 part by mass of polyoxyethylene hardened castor oil ether (BLAUNON RCW-20 (hereunder referred to simply as "RCW-20") by Aoki Oil Industrial Co., Ltd.) as a dispersion stabilizer with respect to an amount of the chemically modified fine fibers 1-3 corresponding to 4 parts by mass in an aqueous dispersion before drying the chemically modified fine fibers 1-3 (solid content: 9 mass %), and using the revolving/rotating stirrer mentioned above for kneading at 30° C. for 30 minutes followed by vacuum drying at about 40° C., and 95 parts by mass of PP, in Production Example 1-3.

Example 1-9 (Fabrication of Resin Composite 1-9)

Resin composite 1-9 was obtained in the same manner as Example 1-8, except that in Example 1-8, the dispersion stabilizer was changed to 1 part by mass of DMSO.

Example 1-10 (Fabrication of Resin Composite 1-10)

Resin composite 1-10 was obtained in the same manner as Example 1-7, except that in Example 1-7, the amount of chemically modified fine fibers 1-3 was changed to 8 parts by mass and the amount of PP was changed to 92 parts by mass.

Example 1-11 (Fabrication of Resin Composite 1-11)

Resin composite 1-11 was obtained in the same manner as Example 1-8, except that in Example 1-8, a solid mixture comprising 8 parts by mass of chemically modified fine fibers 1-3 and 2 parts by mass of RCW-20 (10 parts by mass) (as a dispersion) was mixed with 90 parts by mass of PP, and the mixture was melt kneaded.

Example 1-12 (Fabrication of Resin Composite 1-12)

Resin composite 1-12 was obtained in the same manner as Example 1-9, except that in Example 1-9, a solid mixture comprising 8 parts by mass of chemically modified fine fibers 1-3 and 2 parts by mass of DMSO (10 parts by mass) (as a dispersion) was mixed with 90 parts by mass of PP, and the mixture was melt kneaded.

Example 1-13 (Fabrication of Resin Composite 1-13)

Resin composite 1-13 in the form of a dumbbell-shaped test piece was obtained by melt kneading in the same manner as Example 1-1, using a solid mixture (dispersion) (8 parts by mass) obtained by adding 4 parts by mass of cellulose whiskers (SC900 by Asahi Kasei Corp.) and 2 parts by mass of RCW-20 with respect to an amount of the chemically modified fine fibers 1-2 corresponding to 2 parts by mass in an aqueous dispersion before drying the chemically modified fine fibers 1-2 (solid content: 10 mass %), and using the revolving/rotating stirrer mentioned above for kneading at 30° C. for 30 minutes followed by vacuum drying at about 40° C., and 92 parts by mass of PA66, in Production Example 1-2.

Example 1-14 (Fabrication of Resin Composite 1-14)

Resin composite 1-14 was obtained by producing 12 parts by mass of a solid mixture in the same manner as Example 1-13, except that 4 parts by mass of a plasticizer (W-260 by DIC Co., Ltd.) instead of RCW-20, and 88 parts by mass of PA66, were used in Example 1-13, and then melt kneading the mixture.

Example 1-15 (Fabrication of Resin Composite 1-15)

Resin composite 1-15 was obtained by producing 10 parts by mass of a solid mixture in the same manner as Example 1-13, except that 4 parts by mass of chemically modified fine fibers 1-3 instead of chemically modified fine fibers 1-2 and 90 parts by mass of PP instead of PA66 were used in Example 1-13, and then melt kneading the mixture.

Example 1-16 (Fabrication of Resin Composite 1-16)

Resin composite 1-16 was obtained by producing 12 parts by mass of a solid mixture in the same manner as Example 1-15, except that 4 parts by mass of W-260 was used instead of RCW-20 in Example 1-15, and then melt kneading the mixture.

Example 1-17 (Fabrication of Resin Composite 1-17)

Resin composite 1-17 was obtained in the same manner as Example 1-8, except that in Example 1-8, 12 parts by mass of a solid mixture comprising 10 parts by mass of chemically modified fine fibers 1-2 and 2 parts by mass of RCW-20, was mixed with 88 parts by mass of PA6, and the mixture was melt kneaded.

Example 1-18 (Fabrication of Resin Composite 1-18)

Resin composite 1-18 was obtained by producing 10 parts by mass of a solid mixture in the same manner as Example 1-15, except that 90 parts by mass of PA6 was used instead of PP in Example 1-15, and then melt kneading the mixture.

Example 1-19 (Fabrication of Resin Composite 1-19)

Resin composite 1-19 was obtained in the same manner as Example 1-17, except that the chemically modified fine fibers 1-4 were used in Example 1-17.

Example 1-20 (Fabrication of Resin Composite 1-20)

Resin composite 1-20 was obtained in the same manner as Example 1-17, except that the chemically modified fine fibers 1-5 were used in Example 1-17.

Comparative Example 1-1 (Fabrication of Resin Composite 1-A)

Resin composite 1-A was obtained in the same manner as Example 1-1, except that the chemically modified fine fibers 1-1 were changed to fine fibers 1-1. The resin composite 1-A underwent brown discoloration.

Comparative Example 1-2 (Resin 1-1)

Resin 1-1 was obtained by casting and cooling PP alone, as a blank, under the same melt molding conditions as in Example 1-7.

Comparative Example 1-3 (Resin Composite 1-B)

Resin composite 1-B was obtained in the same manner as Comparative Example 1-2, except that 10 parts by mass of talc was added as a filler component to 90 parts by mass of PP, and the mixture was melt kneaded.

Comparative Example 1-4 (Resin 1-2)

Resin 1-2 was obtained by casting and cooling PA66 alone, as a blank, under the same melt molding conditions as in Example 1-1.

Comparative Example 1-5 (Resin Composite 1-C)

Resin composite 1-C was obtained in the same manner as Comparative Example 1-4, except that 10 parts by mass of talc was added as a filler component to 90 parts by mass of PA66, and the mixture was melt kneaded.

Comparative Example 1-6 (Resin Composite 1-D)

Resin composite 1-D was obtained in the same manner as Example 1-1, except that the chemically modified fine fibers 1-1 were changed to chemically modified fine fibers 1-6. The resin composite 1-D underwent brown discoloration.

Comparative Example 1-7 (Resin Composite 1-E)

Resin composite 1-E was obtained in the same manner as Example 1-2, except that the chemically modified fine fibers 1-1 were changed to chemically modified fine fibers 1-6. The resin composite 1-E underwent brown discoloration.

Comparative Example 1-8 (Resin Composite 1-F)

Resin composite 1-F was obtained in the same manner as Example 1-3, except that the chemically modified fine fibers 1-1 were changed to chemically modified fine fibers 1-6. The resin composite 1-F underwent brown discoloration.

Comparative Example 1-9 (Resin Composite 1-G)

Resin composite 1-G was obtained in the same manner as Example 1-17, except that the chemically modified fine fibers 1-2 were changed to fine fibers 1-1. The resin composite 1-G underwent brown discoloration.

Comparative Example 1-10 (Resin Composite 1-H)

Resin composite 1-H was obtained in the same manner as Example 1-17, except that the chemically modified fine fibers 1-2 were changed to chemically modified fine fibers 1-6. The resin composite 1-H underwent brown discoloration.

Comparative Example 1-11 (Resin Composite 1-I)

Resin composite 1-I was obtained in the same manner as Example 1-17, except that the chemically modified fine fibers 1-2 were changed to chemically modified fine fibers 1-7. The resin composite 1-I underwent brown discoloration.

Table 1 shows the starting materials and sample compositions for Example 1-1 to Example 1-20 and Comparative Examples 1-1 to 1-11.

Example II: Second Embodiment

Example 2-1 (Fabrication of Chemically Modified Fine Fibers 2-1)

After charging 0.5 kg of linter pulp and 9.5 kg of dimethyl sulfoxide (DMSO) into a KAPPA VITA$^R$ rotary homogenizing mixer with a 35 L tank size, operation was carried out for 4 hours at a rotational speed of 6000 rpm, a peripheral speed of 29 m/s and ordinary temperature, for defibration of the pulp (defibrating step). Next, 0.16 kg of sodium bicarbonate and 1.05 kg of vinyl acetate were added and operation was carried out for 2 hours at a rotational speed of 6000 rpm, a peripheral speed of 29 m/s and 60° C. (defibrating/modifying step). After then adding 10 L of purified water to the obtained defibrated and modified slurry and thoroughly stirring, it was placed in a dehydrator and concentrated. The obtained wet cake was again dispersed in 10 L of purified water and stirred and concentrated, and this rinsing procedure was repeated a total of 5 times to remove the unreacted reagent solvent, finally obtaining an aqueous dispersion of the chemically modified fine fibers 2-1 (number-average fiber diameter: 88 nm) (solid content: 10 mass %).

Figure 4:
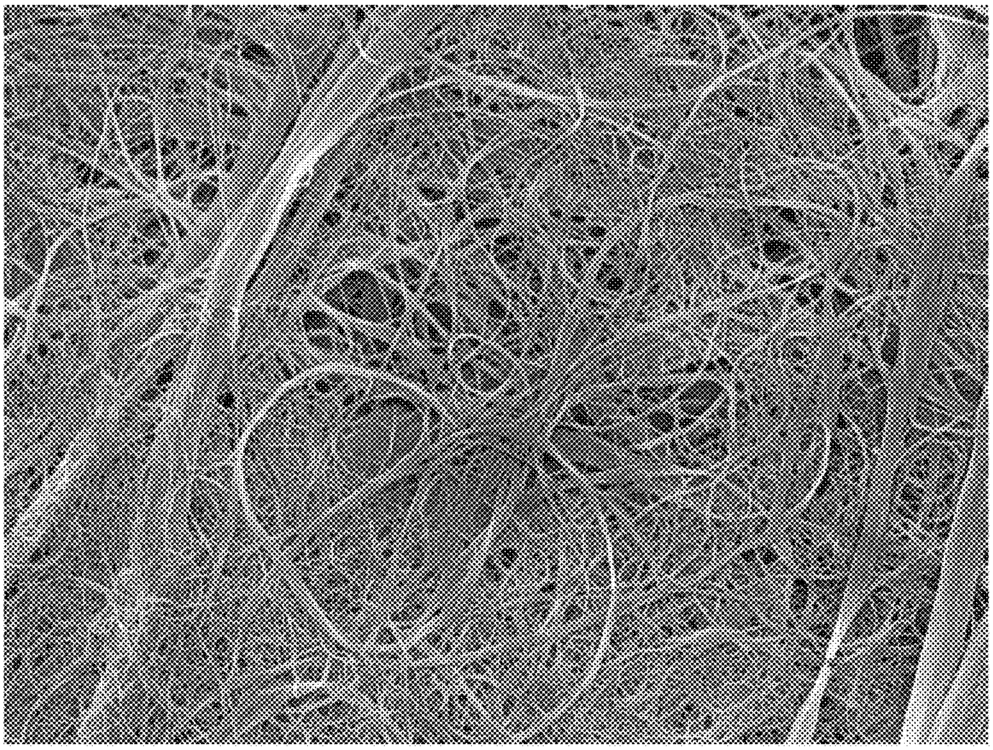
FIG. 4 is a SEM image of the chemically modified fine fibers 2-1 obtained in Example 2-1 of Example II.

FIG. 4 is a diagram showing a scanning electron microscope (SEM) image of the chemically modified fine fibers 2-1. The SEM image was taken using a JSM-6700F by JEOL Corp., under conditions with an acceleration voltage of 5 kV, 10,000× magnification (the visual field size in FIG. 4 is 9 μm×12 μm) and a WD of 7.1 mm.

Example 2-2 (Fabrication of Chemically Modified Fine Fibers 2-2)

Chemically modified fine fibers 2-2 (number-average fiber diameter: 65 nm) were obtained by production in the same manner as Example 2-1, except that high-purity wood pulp was used as the starting material instead of the linter pulp of Example 2-1.

Example 2-3 (Fabrication of Chemically Modified Fine Fibers 2-3)

Using refined linter pulp as the starting material instead of the linter pulp of Example 2-1, 0.5 kg of the refined linter pulp and 9.5 kg of DMSO were charged into a KAPPA VITA$^R$ rotary homogenizing mixer with a tank size of 35 L, and operation was carried out for 4 hours at a rotational speed of 6000 rpm, a peripheral speed of 29 m/s and ordinary temperature, for defibration of the pulp (defibrating step). Next, 0.16 kg of sodium bicarbonate and 1.05 kg of vinyl acetate were added and operation was carried out for 2 hours at a rotational speed of 2500 rpm, a peripheral speed of 12 m/s and 60° C. (modifying step). After then adding 10 L of purified water to the obtained defibrated and modified slurry and thoroughly stirring, it was placed in a dehydrator and concentrated. The obtained wet cake was again dispersed in 10 L of purified water and stirred and concentrated, and this rinsing procedure was repeated a total of 5 times to remove the unreacted reagent solvent, finally obtaining an aqueous dispersion of the chemically modified fine fibers 2-3 (number-average fiber diameter: 80 nm) (solid content: 10 mass %).

Example 2-4 (Fabrication of Chemically Modified Fine Fibers 2-4)

Using 210 g of linter pulp as the starting material for chemically modified fine fibers, stirring was carried out for 1 hour at ordinary temperature with a uniaxial stirrer (DKV-1 φ125 mm Dissolver by Aimex Co.) in 5 kg of dimethyl sulfoxide (DMSO) at 500 rpm. The mixture was then fed to a bead mill (NVM-1.5 by Aimex Co.) using a hose pump and circulated for 2 hours with DMSO alone, to obtain 5.2 kg of defibrated slurry (defibrating step). During the circulation, the rotational speed of the bead mill was 2500 rpm and the circumferential speed was 12 m/s, while the beads used were made of zirconia with a size of Φ2.0 mm and the fill factor was 70% (the slit gap of the bead mill was 0.6 mm). Also during the circulation, the slurry temperature was controlled to 40° C. with a chiller, for absorption of the heat release by abrasion. The obtained defibrated slurry was then loaded into an explosion-proof disperser tank, after which 572 g of vinyl acetate and 85 g of sodium hydrogencarbonate were added, the internal temperature of the tank was brought to 40° C., and stirring was carried out for 2 hours (modifying step). The obtained slurry was dispersed and stirred in 10 L of purified water, and then concentrated with a dehydrator. The obtained wet cake was again dispersed in 10 L of purified water and stirred and concentrated, and this rinsing procedure was repeated a total of 5 times to remove the unreacted reagent solvent, to obtain chemically modified fine fibers 2-4 (number-average fiber diameter: 140 nm).

Example 2-5 (Fabrication of Chemically Modified Fine Fibers 2-5)

Chemically modified fine fibers 2-5 (number-average fiber diameter: 79 nm) were obtained by production in the same manner as Example 2-1, except that filter paper was used as the starting material instead of the linter pulp of Example 2-1.

Example 2-6 (Fabrication of Chemically Modified Fine Fibers 2-6)

Chemically modified fine fibers 2-6 (number-average fiber diameter: 66 nm) were obtained by production in the same manner as Example 2-3, except that separate refined linter pulp was used as the starting material instead of the linter pulp of Example 2-3.

Comparative Example 2-1 (Fabrication of Chemically Modified Fine Fibers 2-7)

Chemically modified fine fibers 2-7 (number-average fiber diameter: 58 nm) were obtained by production in the same manner as Example 2-1, except that wood pulp was used as the starting material instead of the linter pulp of Example 2-1.

Comparative Example 2-2 (Fabrication of chemically modified fine fibers 2-8)

Chemically modified fine fibers 2-8 (number-average fiber diameter: 73 nm) were obtained by production in the same manner as Example 2-1, except that abaca was used as the starting material instead of the linter pulp of Example 2-1.

Comparative Example 2-3 (Fabrication of chemically modified fine fibers 2-9)

Chemically modified fine fibers 2-9 (number-average fiber diameter: 84 nm) were obtained by production in the same manner as Example 2-3, except that different refined linter pulp from the refined linter pulp of Example 2-3 was used.

Comparative Example 2-4 (Fabrication of chemically modified fine fibers 2-10)

Chemically modified fine fibers 2-10 (number-average fiber diameter: 64 nm) were obtained by production in the same manner as Example 2-4, except that the circulation time for DMSO alone after feeding to the bead mill as described in Example 2-4 was changed from 2 hours to 8 hours.

Comparative Example 2-5 (Fabrication of chemically modified fine fibers 2-11)

After adding 50 g of filter paper and 300 g of 1-butyl-3-methylimidazolium chloride as an ionic liquid to 300 ml of N,N-dimethylacetamide, the mixture was stirred. Next, 270 g of acetic anhydride was added and reacted, after which the mixture was filtered and the solid content was rinsed with water. It was then treated with a high-pressure homogenizer to obtain chemically modified fine fibers 2-11 (number-average fiber diameter: 44 nm).

Comparative Example 2-6 (Preparation of non-chemically-modified fine fibers 2-1)

CELISH KY-100G (number-average fiber diameter: 75 nm) by Daicel were prepared as non-chemically-modified fine cellulose fibers.

The following examples are chemically modified fine fibers of Examples 2-1 to 2-6 and Comparative Examples 2-1 to 2-6, or complexes with resins using the fine fibers.

Example 2-7 (Fabrication of resin composite 2-1)

Upon adding 2 parts by mass of the obtained chemically modified fine fibers 2-1 (as the solid content in the slurry, same hereunder) and 98 parts by mass of polyamide 66 resin (hereunder referred to simply as "PA66") (A226 by Unitika, Ltd.) as resin 2-1, a mini kneader ("Xplore", product name of Xplore Instruments) was used for circulated kneading for 5 minutes at 260° C., 100 rpm (shear rate: 1570 (1/s)), after which it was passed through a die to obtain a φ1 mm strand of a composite resin composition. Resin composite pellets obtained from the strand (after cutting the strand to 1 cm lengths) were melted at 260° C. with an accessory injection molding machine, and the resin was used to form a dumbbell-shaped test piece conforming to JIS K7127, which was used for evaluation. Resin composite 2-1 in the form of the obtained dumbbell-shaped test piece was used to carry out the appropriate evaluations.

Example 2-8 (Fabrication of resin composite 2-2)

Resin composite 2-2 was obtained in the same manner as Example 2-7, except that the amount of chemically modified fine fibers 2-1 was changed to 10 parts by mass and the amount of PA66 was changed to 90 parts by mass.

Example 2-9 (Fabrication of Resin Composite 2-3)

Resin composite 2-3 was obtained in the same manner as Example 2-8, except that the PA66 of Example 2-8 was changed to PA6 (1013B by Ube Industries, Ltd.) (hereunder referred to simply as "PA6") as the resin 2-2, and the kneading temperature in the mini kneader and the molding temperature in the injection molding machine were changed to 250° C.

Example 2-10 (Fabrication of Resin Composite 2-4)

Resin composite 2-4 in different forms of dumbbell-shaped test pieces was obtained in the same manner as Example 2-7, except that the PA66 of Example 2-7 was changed to 96 parts by mass of a polypropylene resin (Prime Polypro J105G by Prime Polymer Co., Ltd.) (hereunder referred to simply as "PP"), as resin 2-3, and the kneading temperature with the mini kneader and the molding temperature with the injection molding machine were changed to 160° C.

Example 2-11 (Fabrication of Resin Composite 2-5)

Resin composite 2-5 in different forms of dumbbell-shaped test pieces was obtained in the same manner as Example 2-7, using a solid mixture (dispersion) (10 parts by mass) of the chemically modified fine fibers 2-1 and polyoxyethylene hardened castor oil ether (BLAUNON RCW-20 (hereunder referred to simply as "RCW-20") by Aoki Oil Industrial Co., Ltd.), obtained by adding 3 parts by mass of RCW-20 as a dispersion stabilizer, with respect to an amount of the chemically modified fine fibers 2-1 corresponding to 7 parts by mass in an aqueous dispersion before drying the chemically modified fine fibers 2-1 (solid content: 9 mass %), and using the revolving/rotating stirrer mentioned above for kneading at 30° C. for 30 minutes followed by vacuum drying at about 40° C., and 90 parts by mass of PA6, in Example 2-7.

Example 2-12 (Fabrication of Resin Composite 2-6)

Resin composite 2-6 in different forms of dumbbell-shaped test pieces was obtained in the same manner as Example 2-11, except that in Example 2-11, 2 parts by mass of cellulose whiskers (SC900, by Asahi Kasei Corp.) was mixed with the aqueous dispersion of the chemically modified fine fibers 2-1 prior to drying and RCW-20 to obtain a solid mixture (12 parts by mass), and then the solid mixture (12 parts by mass) and 88 parts by mass of PA6 were used.

Comparative Example 2-7 (Fabrication of Resin Composite 2-7)

Resin composite 2-7 was obtained by fabrication in the same manner as Example 2-9, except that the chemically modified fine fibers 2-1 were changed to fine fibers 2-1. The resin composite 2-7 underwent brown discoloration.

Comparative Example 2-8 (Fabrication of resin composite 2-8)

Resin composite 2-8 was obtained by fabrication in the same manner as Example 2-9, except that the chemically modified fine fibers 2-1 were changed to chemically modified fine fibers 2-7. The resin composite 2-8 underwent brown discoloration.

The compositions of the starting materials and samples for the Examples and Comparative Examples are shown in Table 4.

Evaluation of Fine Fibers and Resin Composites

The results of evaluating the properties in Examples I and II are shown below in Tables 2, 3 and 5.

(1) Fabrication of Measuring Samples

The chemically modified fine fibers or the fine fibers were evaluated using a porous sheet as the measuring sample. A porous sample was fabricated in the following manner.

First, an aqueous dispersion of the chemically modified fine fibers or the fine fibers was centrifuged to obtain a condensate (solid content: 25 mass %). Next, the concentrate containing 0.5 g of the chemically modified fine fibers or the fine fibers was dispersed in tert-butanol to 0.2 mass %, and dispersion treatment was carried out by ultrasonic dispersion until it was free of aggregates. A 100 g portion of the obtained tert-butanol dispersion was filtered on filter paper (5C, Advantech, Inc., diameter: 90 mm) and dried at 150° C., and then the filter paper was detached to obtain a sheet. Sheets with air permeability resistance up to 100 sec/100 ml per 10 g/m$^2$ basis weight of the sheet were considered to be porous sheets, and were used as measuring samples.

For the air permeability resistance (sec/100 ml) per 10 g/m$^2$ of basis weight of the sheet, the basis weight W (g/m$^2$) of each sample that had been left to stand for 1 day in an environment of 23° C., 50% RH was measured, and then an Oken-type air permeability resistance tester (Model EG01 by Asahi Seiko Co., Ltd.) was used to measure the air permeability resistance R (sec/100 ml). The value per 10 g/m$^2$ basis weight was calculated by the following formula.

$$\text{Air permeability resistance (sec/100 ml) per 10 g/m}^2\text{ basis weight} = R/W\times 10$$

(2) Number-Average Fiber Diameter

First, three randomly selected locations on the surface of the porous sheet were observed with a scanning electron microscope (SEM) at a magnification corresponding to 10,000-100,000×, according to the fiber diameter of the fine fibers. For each of the three obtained SEM images, lines were drawn on the image surface in the weft direction and the warp direction, the number of fibers crossing the lines and the fiber diameters of each of the fibers were measured from the magnified image, and the number-average fiber diameters for the warp/weft rows were calculated for each image. The number average of the number-average fiber diameter for the 3 images was recorded as the mean fiber diameter of the measured sample.

(3) Specific Surface Area

The BET specific surface area (m$^2$/g) was calculated with the program of a specific surface area/pore distribution measuring apparatus (Nova-4200e, by Quantachrome Instruments), after drying approximately 0.2 g of the porous sheet sample for 2 hours in a vacuum at 120° C. and measuring the nitrogen gas adsorption at the boiling point of liquid nitrogen at five points (multipoint method) in a relative vapor pressure ($P/P_0$) range of 0.05 to 0.2.

(4) IR Index

The infrared spectroscopy spectrum of the porous sheet was measured by the ATR-IR method, using a Fourier transform infrared spectrometer (FT/IR-6200 by Jasco Corp.). The infrared spectroscopy spectrum was measured under the following conditions.

Number of scans: 64 times,
wavenumber resolution: 4 cm$^{-1}$,
measuring wavenumber range: 4000 to 600 cm$^{-1}$,
ATR crystal: diamond,
incident angle: 45°

(4-1) IR Index 1370

Based on the obtained IR spectrum, the IR index 1370 was calculated according to the following formula (1):

$$IR\text{ index }1370 = H1730/H1370. \tag{1}$$

In the formula, H1730 and H1370 are the absorbances at 1730 cm$^{-1}$ (absorption band for acyl group C═O stretching vibration) and 1370 cm$^{-1}$ (absorption band for C—H stretching vibration of the cellulose backbone chain). The respective baselines used were a line connecting 1900 cm$^{-1}$ and 1500 cm$^{-1}$ (for H1730) and a line connecting 800 cm$^{-1}$ and 1500 cm$^{-1}$ (for H1370), each baseline being defined as the absorbance at absorbance=0.

(4-2) IR Index 1030

Based on the obtained IR spectrum, the IR index 1030 was calculated according to the following formula (2):

$$IR\text{ index }1030 = H1730/H1030. \tag{2}$$

In the formula, H1730 and H1030 are the absorbances at 1730 cm$^{-1}$ and 1030 cm$^{-1}$ (absorption bands for C—O stretching vibration of the cellulose backbone chain). The respective baselines used were a line connecting 1900 cm$^{-1}$ and 1500 cm$^{-1}$ and a line connecting 800 cm$^{-1}$ and 1500 cm$^{-1}$. each baseline being defined as the absorbance at absorbance=0.

The average degree of substitution (DS) was calculated from the IR index 1030 according to the following formula (3):

$$DS = 4.13\times IR\text{ index }1030. \tag{3}$$

(5) DS Non-Uniformity Ratio and its Coefficient of Variation (CV)

A 100 g portion of the aqueous dispersion of the chemically modified fine fibers (solid content: 10 mass %) was sampled, and 10 g of each was frozen and pulverized to prepare 10 powder samples. The powder sample mass was 1 g each. The 10 powder samples were measured by $^{13}C$ solid NMR and XPS, the DSt and DSs of each was determined, and the DS non-uniformity ratio was calculated for each powder sample. The coefficient of variation was calculated using the standard deviation (σ) and arithmetic mean (μ) of the DS non-uniformity ratio for each of the obtained 10 samples.

$$DS\ \text{Non-uniformity ratio} = DSs/DSt$$

$$\text{Coefficient of variation (\%)} = \text{standard deviation } \sigma/\text{arithmetic mean } \mu \times 100$$

The method of calculating DSt may be subjecting the powder chemically modified fine fibers to $^{13}C$ solid NMR measurement, and determining DSt according to the following formula using the area intensity (Inf) of the signal (23 ppm) attributed to the carbon atom of —$CH_3$ of the acetyl group, with respect to the total area intensity (Inp) of the signals attributed to C1-C6 carbons of the pyranose rings of cellulose, appearing in the range of 50 ppm to 110 ppm.

$$DSt = (Inf) \times 6/(Inp)$$

The conditions used in the $^{13}C$ solid NMR measurement may be as follows, for example. Apparatus: Bruker Biospin Avance 500WB Frequency: 125.77 MHz
Measuring method: DD/MAS
Latency time: 75 sec
NMR sample tube: 4 mmφ
Number of scans: 640 (~14 hr)
MAS: 14,500 Hz
Chemical shift reference: glycine (external reference: 176.03 ppm)

As the method of calculating DSs, a powder sample of the chemically modified fine fibers used for $^{13}C$ solid NMR measurement was placed on a 2.5 mmφ dish-shaped sample stand, the surface was pressed flat and XPS measurement was performed. The obtained C1s spectrum was analyzed by peak separation, and DSs was determined by the following formula using the area intensity (Ixf) of the peak (286 eV) attributed to the acetyl group O—C═O bond with respect to the area intensity (Ixp) of the peak attributed to the C2-C6 carbons of the pyranose rings of cellulose (289 eV, C—C bond).

$$DSs = (Ixf) \times 5/(Ixp)$$

The conditions used for XPS measurement were the following.

Device: VersaProbe II by Ulvac-Phi, Inc.
Excitation source: mono. AlKα 15 kV×3.33 mA
Analysis size: ~200 μmφ
Photoelectron take-off angle: 45°
Capture range
Narrow scan: C 1s, O 1s
Pass Energy: 23.5 e V (6) Degree of Crystallinity The porous sheet was subjected to X-ray diffraction and the degree of crystallinity was calculated by the following formula.

$$\text{Degree of crystallinity (\%)} = [I_{(200)} - I_{(amorphous)}]/I_{(200)} \times 100$$

$I_{(200)}$: Diffraction peak intensity at 200 plane (2θ=22.5°) of type I cellulose crystal $I_{(amorphous)}$: Amorphous halo peak intensity for type I cellulose crystal, peak intensity at angle of 4.5° lower than diffraction angle at 200 plane (2θ=18.0°).

X-Ray Diffraction Measuring Conditions

Apparatus: MiniFlex (Rigaku Corp.)
Operating shaft: 2θ/θ
Source: CuKα
Measuring method: Continuous
Voltage: 40 kV
Current: 15 mA
Initial angle: 2θ=5°
Final angle: 2θ=30°
Sampling width: 0.020°
Scan speed: 2.0°/min
Sample: Porous sheet attached to specimen holder.

(7) Weight-Average Molecular Weight (Mw) and Number-Average Molecular Weight (Mn)

After weighing out 0.88 g of the porous sheet of the chemically modified fine fibers or the fine fibers and chopping it into small pieces with scissors, the pieces were gently stirred and allowed to stand for one day after addition of 20 mL of purified water. The water and solid portion were then separated by centrifugation. After then adding 20 mL of acetone, the mixture was gently stirred and allowed to stand for 1 day. The acetone and solid portion were separated by centrifugation. After then adding 20 mL of N,N-dimethylacetamide, the mixture was gently stirred and allowed to stand for 1 day. Centrifugal separation was again carried out to separate the N,N-dimethylacetamide and solid content, and then 20 mL of N,N-dimethylacetamide was added and the mixture was gently stirred and allowed to stand for 1 day. The N,N-dimethylacetamide and solid content were separated by centrifugation, 19.2 g of a N,N-dimethylacetamide solution prepared to a lithium chloride content of 8 mass % was added to the solid portion, and the mixture was stirred with a stirrer while visually confirming dissolution. The cellulose-dissolving solution was filtered with a 0.45 μm filter, and the filtrate was supplied as a sample for gel permeation chromatography. The apparatus and measuring conditions used were as follows.

Apparatus: Tosoh Corp. HLC-8120
Column: TSKgel SuperAWM-H (6.0 mm I.D.×15 cm)×2
Detector: RI detector
Eluent: N,N-dimethylacetamide (lithium chloride: 0.2%)
Calibration curve: Based on pullulan (8) Alkali-Soluble Content The alkali-soluble portion was determined by a method described in non-patent literature (Mokushitsu Kagaku Jikken Manual, ed. The Japan Wood Research Society, pp. 92-97, 2000), subtracting the α-cellulose content from the holocellulose content (Wise method).

(9) Mean Content for Acid-Insoluble Component and Mean Content for Acid-Insoluble Component Per Unit Specific Surface Area The acid-insoluble component was quantified by the Klason method, described in non-patent literature (Mokushitsu Kagaku Jikken Manual, ed. The Japan Wood Research Society, pp. 92-97, 2000). The sample of the absolutely dried chemically modified fine fibers or the fine fibers was weighed and placed in a prescribed container, 72 mass % concentrated sulfuric acid was added, and the mixture was pressed with a glass rod until the contents became uniform, after which an autoclave was used to dissolve the cellulose and hemicellulose in the acid solution. The contents that had been allowed to cool were filtered with glass fiber filter paper to separate off the acid-insoluble component, which was quantified to calculate the acid-insoluble component content of the sample. The mean content was calculated as the number-average value for 3 samples, and the value was recorded as the mean content for the acid-insoluble component for the chemically modified fine fibers. The mean content for the acid-insoluble component per specific surface area (mass %·g/m$^2$) was calculated from this calculated value.

(10) Thermal Decomposition Initiation Temperature ($T_D$) and 1 wt % Weight Reduction Temperature ($T_{1\%}$)

Thermal analysis of the porous sheet was conducted by the following method.

Apparatus: EXSTAR6000 by SII Co.

Sample: Circular pieces cut out from the porous sheet were placed and stacked in an aluminum sample pan, in an amount of 10 mg.

Sample weight: 10 mg

Measuring conditions: Temperature increase from room temperature to 150° C. at a temperature-elevating rate of 10° C./min, in a nitrogen flow of 100 ml/min, and holding at 150° C. for 1 hour, followed by cooling to 30° C. Subsequent temperature increase from 30° C. to 450° C. at a temperature-elevating rate of 10° C./min.

$T_D$ calculation method: Calculation was from a graph with temperature on the abscissa and weight reduction % on the ordinate. Starting from the weight of chemically modified fine fibers at 150° C. (with essentially all of the moisture content removed) (a weight reduction of 0 wt %) and increasing the temperature, a straight line was obtained running through the temperature at 1 wt % weight reduction and the temperature at 2 wt % weight reduction. The temperature at the point of intersection between this straight line and a horizontal (baseline) running through the origin at weight reduction 0 wt %, was recorded as the thermal decomposition initiation temperature ($T_D$).

$T_{1\%}$ calculation method: The temperature at 1 wt % weight reduction used for $T_D$ calculation was recorded as the 1 wt % weight reduction temperature.

(11) 250° C. Weight Change Rate ($T_{250°\ C.}$)

Apparatus: EXSTAR6000 by SII Co.

Sample: Circular pieces cut out from the porous sheet were placed and stacked in an aluminum sample pan, in an amount of 10 mg.

Sample weight: 10 mg

Measuring conditions: Temperature increase from room temperature to 150° C. at a temperature-elevating rate of 10° C./min, in a nitrogen flow of 100 ml/min, and holding at 150° C. for 1 hour, followed by temperature increase from 150° C. to 250° C. at 10° C./min and holding at 250° C. for 2 hours.

$T_{250°\ C.}$ calculation method: Starting from weight WO as the point where 250° C. was reached, the weight after holding at 250° C. for 2 hours was recorded as W1, and calculation was performed by the following formula.

$$T_{250°\ C.}(\%): (W1-W0)/W0\times 100$$

(12) Change in YI (ΔYI) after Heat Aging

The porous sheet was placed in an oven, and operation was carried out for 3000 hours at 150° C., atmospheric pressure for heat aging. The degree of yellowing of the porous sheet before heat aging and after heat aging was evaluated by YI measurement. The YI measurement was carried out using a CM-700d spectrocolorimeter by Konica Minolta Holdings, Inc. under conditions with reflective mode (SCI+SCE), and a measuring diameter of 3 mm, and the average value for the YI at 5 arbitrary locations was determined. The YI before heat aging was subtracted from the YI after heat aging to obtain ΔYI.

(13) Sheet Strength after Heat Aging

The porous sheet was placed in an oven, and operation was carried out for 3000 hours at 150° C., atmospheric pressure for heat aging. A 1 cm-wide, 3 cm-long sample strip was cut out from the sample after heat aging, and pulled with forceps until it tore. The sheet strength was evaluated as "Good" if it tore during pulling and resistance was felt by the hand, the sheet strength was evaluated as "Acceptable" if it tore during pulling and resistance was not felt by the hand, and the sheet strength was evaluated as "Poor" if the sample disintegrated at the location gripped by the forceps during pulling.

(14) Storage Modulus Change Ratio

The obtained resin composite dumbbell was cut to 4 mm width×30 mm length as a measuring sample. Using an EXSTAR TMA6100 viscoelasticity meter (product of SII Nanotechnology, Inc.), the storage modulus was measured under a nitrogen atmosphere in tension mode, with a chuck distance of 20 mm and a frequency of 1 Hz. In order to relax distortion during molding of the dumbbell during the measurement, the temperature was increased from room temperature to a high temperature at 5° C./min and then lowered to 25° C. at 5° C./min and again increased from 25° C. to the high temperature at 5° C./min, as the temperature profile, and the storage modulus change ratio at the time of the second temperature increase was measured. The value of the storage modulus at low temperature divided by the storage modulus at high temperature was compared, as the storage modulus change ratio.

For Example I (first embodiment), the low temperature/high temperature ratio was 100° C./200° C. for PA66 and PA6, and 50° C./100° C. for PP and NBR.

For Example II (second embodiment), the low temperature/high temperature ratio was 0° C./150° C. for PA66 and PA6, and −50° C./100° C. for PP.

Generally, the storage modulus is lower at higher temperature, and therefore the storage modulus change ratio is greater than 1. A value closer to 1 may be considered to be lower change in storage modulus at high temperature, and thus higher heat resistance.

(15) Outer Appearance

The outer appearance of a sample obtained after forming a composite of the kneaded resin was evaluated as "Poor" if there were clear burnt deposits (browning), "Good" if no discoloration was visible, or "Acceptable" if there were slight burnt deposits.

(16) Linear Coefficient of Thermal Expansion (CTE)

The resin composite or resin was cut to 3 mm width×25 mm length as a measuring sample. It was measured using a model SII TMA6100 in tension mode with a chuck distance of 10 mm and load of 5 g, under a nitrogen atmosphere, raising the temperature from room temperature to 120° C. at 5° C./min, lowering the temperature to 25° C. at 5° C./min, and then again raising the temperature from 25° C. to 120° C. at 5° C./min. The average linear coefficient of thermal expansion from 30° C. to 100° C. at the time of the second temperature increase was measured.

(17) Flexural Modulus Increase Ratio

An injection molding machine was used to mold an 80 mm×10 mm×4 mm test piece, and the flexural modulus of each test piece was measured according to ISO178. The obtained flexural modulus was divided by the flexural modulus of the base resin containing no filler component (that is, cellulose or other filler) to calculate the flexural modulus increase ratio. That is, the value for a test piece with no increase in flexural modulus was 1.0.

(18) Flexural Strength Increase Ratio

An injection molding machine was used to mold an 80 mm×10 mm×4 mm test piece, and the flexural strength of each test piece was measured according to ISO178. The obtained flexural strength was divided by the flexural strength of the base resin containing no filler component, to calculate the flexural strength increase ratio. That is, the value for a test piece with no increase in flexural strength was 1.0.

TABLE 1

| | | Cellulose material | | Resin material | | Dispersion stabilizer | |
|---|---|---|---|---|---|---|---|
| | Sample name | Name | Parts by mass | Name | Parts by mass | Name | Parts by mass |
| Example 1-1 | Resin composite 1-1 | Chemically modified fine fibers 1-1 | 2 | PA66 | 98 | — | — |
| Example 1-2 | Resin composite 1-2 | Chemically modified fine fibers 1-1 | 4 | PA66 | 96 | — | — |
| Example 1-3 | Resin composite 1-3 | Chemically modified fine fibers 1-1 | 8 | PA66 | 92 | — | — |
| Example 1-4 | Resin composite 1-4 | Chemically modified fine fibers 1-2 | 4 | PA66 | 96 | — | — |
| Example 1-5 | Resin composite 1-5 | Chemically modified fine fibers 1-1 | 4 | NBR | 96 | — | — |
| Example 1-6 | Resin composite 1-6 | Chemically modified fine fibers 1-1 | 4 | PA6 | 96 | — | — |
| Example 1-7 | Resin composite 1-7 | Chemically modified fine fibers 1-3 | 4 | PP | 96 | — | — |
| Example 1-8 | Resin composite 1-8 | Chemically modified fine fibers 1-3 | 4 | PP | 95 | RCW-20 | 1 |
| Example 1-9 | Resin composite 1-9 | Chemically modified fine fibers 1-3 | 4 | PP | 95 | DMSO | 1 |
| Example 1-10 | Resin composite 1-10 | Chemically modified fine fibers 1-3 | 8 | PP | 92 | — | — |
| Example 1-11 | Resin composite 1-11 | Chemically modified fine fibers 1-3 | 8 | PP | 90 | RCW-20 | 2 |
| Example 1-12 | Resin composite 1-12 | Chemically modified fine fibers 1-3 | 8 | PP | 90 | DMSO | 2 |
| Example 1-13 | Resin composite 1-13 | Chemically modified fine fibers 1-2 | 2 | PA66 | 92 | RCW-20 | 2 |
| | | Cellulose whiskers SC900 | 4 | | | | |
| Example 1-14 | Resin composite 1-14 | Chemically modified fine fibers 1-2 | 2 | PA66 | 90 | W-260 | 4 |
| | | Cellulose whiskers SC900 | 4 | | | | |
| Example 1-15 | Resin composite 1-15 | Chemically modified fine fibers 1-3 | 4 | PP | 90 | RCW-20 | 2 |
| | | Cellulose whiskers SC900 | 4 | | | | |
| Example 1-16 | Resin composite 1-16 | Chemically modified fine fibers 1-3 | 4 | PP | 88 | W-260 | 4 |
| | | Cellulose whiskers SC900 | 4 | | | | |
| Example 1-17 | Resin composite 1-17 | Chemically modified fine fibers 1-2 | 10 | PA6 | 88 | RCW-20 | 2 |
| Example 1-18 | Resin composite 1-18 | Chemically modified fine fibers 1-3 | 4 | PA6 | 90 | RCW-20 | 2 |
| | | Cellulose whiskers SC900 | 4 | | | | |
| Example 1-19 | Resin composite 1-19 | Chemically modified fine fibers 1-4 | 10 | PA6 | 88 | RCW-20 | 2 |
| Example 1-20 | Resin composite 1-20 | Chemically modified fine fibers 1-5 | 10 | PA6 | 88 | RCW-20 | 2 |
| Comp. Example 1-1 | Resin composite 1-A | Fine fibers 1-1 | 4 | PA66 | 96 | — | — |
| Comp. Example 1-2 | Resin 1-1 | — | — | PP | 100 | — | — |
| Comp. Example 1-3 | Resin composite 1-B | — | — | PP | 90 | Talc | 10 |
| Comp. Example 1-4 | Resin 1-2 | — | — | PA66 | 100 | — | — |
| Comp. Example 1-5 | Resin composite 1-C | — | — | PA66 | 90 | Talc | 10 |
| Comp. Example 1-6 | Resin composite 1-D | Chemically modified fine fibers 1-6 | 2 | PA66 | 98 | — | — |
| Comp. Example 1-7 | Resin composite 1-E | Chemically modified fine fibers 1-6 | 4 | PA66 | 96 | — | — |
| Comp. Example 1-8 | Resin composite 1-F | Chemically modified fine fibers 1-6 | 8 | PA66 | 92 | — | — |
| Comp. Example 1-9 | Resin composite 1-G | Fine fibers 1-1 | 10 | PA6 | 88 | RCW-20 | 2 |
| Comp. Example 1-10 | Resin composite 1-H | Chemically modified fine fibers 1-6 | 10 | PA6 | 88 | RCW-20 | 2 |
| Comp. Example 1-11 | Resin composite 1-I | Chemically modified fine fibers 1-7 | 10 | PA6 | 88 | RCW-20 | 2 |

TABLE 2

| | Name | Material type | Fiber diameter Nm | Specific surface area $M^2/g$ | IR Index 1370 — | IR Index 1030 — | DS — | DS Non-uniformity ratio — | CV % | Degree of crystallinity % | Mean content for acid-insoluble component mass % | Mean content for acid-insoluble component per unit specific surface area mass % · $g/m^2$ |
|---|---|---|---|---|---|---|---|---|---|---|---|---|
| Prod. Example 1-1 | Chemically modified fine fibers 1-1 | Filter paper | 180 | 15 | 1.08 | 0.21 | 0.87 | 1.44 | 19 | 75 | 0.18 | 0.01 |
| Prod. Example 1-2 | Chemically modified fine fibers 1-2 | Linter | 65 | 41 | 1.05 | 0.20 | 0.84 | 1.39 | 18 | 65 | 4.7 | 0.11 |

TABLE 2-continued

| | Name | Material type | Fiber diameter Nm | Specific surface area $M^2/g$ | IR Index 1370 — | IR Index 1030 — | DS — | DS Non-uniformity ratio — | CV % | Degree of crystallinity % | Mean content for acid-insoluble component mass % | Mean content for acid-insoluble component per unit specific surface area mass % · $g/m^2$ |
|---|---|---|---|---|---|---|---|---|---|---|---|---|
| Prod. Example 1-3 | Chemically modified fine fibers 1-3 | Linter | 120 | 23 | 1.12 | 0.22 | 0.93 | 1.31 | 29 | 75 | 4.7 | 0.20 |
| Prod. Example 1-4 | Chemically modified fine fibers 1-4 | Linter | 125 | 22 | 0.44 | 0.05 | 0.20 | 1.61 | 39 | 81 | 4.7 | 0.21 |
| Prod. Example 1-5 | Chemically modified fine fibers 1-5 | Linter | 115 | 24 | 1.44 | 0.39 | 1.40 | 1.14 | 14 | 71 | 4.7 | 0.20 |
| Prod. Example 1-6 | Chemically modified fine fibers 1-6 | Linter | 75 | 36 | 1.01 | 0.19 | 0.79 | 1.92 | 51 | 74 | 4.7 | 0.13 |
| Prod. Example 1-7 | Fine fibers 1-1 | Celish | 100 | 27 | — | — | | — | — | 82 | 2.5 | 0.09 |
| Prod. Example 1-8 | Chemically modified fine fibers 1-7 | Filter paper | 44 | 61 | 1.36 | 0.31 | 1.28 | 1.05 | 15 | 71 | 0.18 | 0.003 |

TABLE 3

| | Name | Thermal decomposition initiation temperature ° C. | 1% Weight reduction temperature ° C. | 250° C. Weight change rate % | Resin material — | Storage modulus change ratio* — | Outer appearance Good, Acceptable, Poor | CTE ppm/k | Flexural elasticity increase ratio — | Flexural strength increase ratio — |
|---|---|---|---|---|---|---|---|---|---|---|
| Example 1-1 | Resin composite 1-1 | 289 | 307 | −1.2 | PA66 | 1.85 | Good | 68 | 1.36 | 1.33 |
| Example 1-2 | Resin composite 1-2 | 289 | 307 | −1.2 | PA66 | 1.70 | Good | 65 | 1.46 | 1.40 |
| Example 1-3 | Resin composite 1-3 | 289 | 307 | −1.2 | PA66 | 1.61 | Good | 62 | 1.51 | 1.40 |
| Example 1-4 | Resin composite 1-4 | 288 | 307 | −1.3 | PA66 | 1.73 | Good | 66 | 1.34 | 1.39 |
| Example 1-5 | Resin composite 1-5 | 289 | 307 | −1.2 | NBR | 1.20 | Good | 63 | 1.41 | 1.42 |
| Example 1-6 | Resin composite 1-6 | 289 | 307 | −1.2 | PA6 | 2.12 | Good | 73 | 1.44 | 1.42 |
| Example 1-7 | Resin composite 1-7 | 289 | 308 | −1.1 | PP | 1.92 | Good | 56 | 1.62 | 1.46 |
| Example 1-8 | Resin composite 1-8 | 289 | 308 | −1.1 | PP | 1.76 | Good | 46 | 1.68 | 1.51 |
| Example 1-9 | Resin composite 1-9 | 289 | 308 | −1.1 | PP | 1.79 | Good | 48 | 1.80 | 1.60 |
| Example 1-10 | Resin composite 1-10 | 289 | 308 | −1.1 | PP | 1.80 | Good | 50 | 1.91 | 1.68 |
| Example 1-11 | Resin composite 1-11 | 289 | 308 | −1.1 | PP | 1.76 | Good | 43 | 2.00 | 1.72 |
| Example 1-12 | Resin composite 1-12 | 289 | 308 | −1.1 | PP | 1.80 | Good | 47 | 2.10 | 1.82 |
| Example 1-13 | Resin composite 1-13 | 288 | 307 | −1.3 | PA66 | 1.63 | Good | 42 | 1.82 | 1.60 |
| Example 1-14 | Resin composite 1-14 | 288 | 307 | −1.3 | PA66 | 1.81 | Good | 43 | 1.75 | 1.55 |
| Example 1-15 | Resin composite 1-15 | 289 | 308 | −1.1 | PA66 | 1.48 | Good | 41 | 2.33 | 2.00 |
| Example 1-16 | Resin composite 1-16 | 289 | 308 | −1.1 | PA66 | 1.69 | Good | 43 | 2.18 | 1.89 |
| Example 1-17 | Resin composite 1-17 | 288 | 307 | −1.3 | PA6 | 1.89 | Good | 39 | 1.78 | 1.70 |
| Example 1-18 | Resin composite 1-18 | 288 | 307 | −1.3 | PA6 | 1.99 | Good | 45 | 1.65 | 1.65 |
| Example 1-19 | Resin composite 1-19 | 271 | 289 | −2.7 | PA6 | 2.01 | Acceptable | 44 | 1.43 | 1.39 |
| Example 1-20 | Resin composite 1-20 | 293 | 309 | −1.1 | PA6 | 1.75 | Good | 33 | 1.68 | 1.71 |
| Comp. Example 1-1 | Resin composite 1-A | 225 | 243 | −16.4 | PA66 | 2.39 | Poor | 80 | 1.01 | 0.99 |
| Comp. Example 1-2 | Resin 1-1 | — | — | — | PP | 2.43 | Good | 110 | — | — |
| Comp. Example 1-3 | Resin composite 1-B | — | — | — | PP | 2.20 | Good | 85 | 1.12 | 1.04 |

TABLE 3-continued

| | Name | Thermal decomposition initiation temperature ° C. | 1% Weight reduction temperature ° C. | 250° C. Weight change rate % | Resin material — | Storage modulus change ratio* — | Outer appearance Good, Acceptable, Poor | CTE ppm/k | Flexural elasticity increase ratio — | Flexural strength increase ratio — |
|---|---|---|---|---|---|---|---|---|---|---|
| Comp. Example 1-4 | Resin 1-2 | — | — | — | PA66 | 2.50 | Good | 80 | — | — |
| Comp. Example 1-5 | Resin composite 1-C | — | — | — | PA66 | 2.29 | Good | 60 | 1.22 | 1.10 |
| Comp. Example 1-6 | Resin composite 1-D | 263 | 281 | −3.0 | PA66 | 2.30 | Acceptable | 77 | 1.06 | 1.03 |
| Comp. Example 1-7 | Resin composite 1-E | 263 | 281 | −3.0 | PA66 | 2.25 | Acceptable | 71 | 1.16 | 1.11 |
| Comp. Example 1-8 | Resin composite 1-F | 263 | 281 | −3.0 | PA66 | 2.12 | Poor | 70 | 1.22 | 1.18 |
| Comp. Example 1-9 | Resin composite 1-G | 225 | 243 | −16.4 | PA6 | 2.05 | Poor | 65 | 1.23 | 1.16 |
| Comp. Example 1-10 | Resin composite 1-H | 263 | 281 | −3.0 | PA6 | 2.04 | Poor | 58 | 1.27 | 1.27 |
| Comp. Example 1-11 | Resin composite 1-I | 269 | 287 | −2.8 | PA6 | 2.02 | Poor | 63 | 1.20 | 1.17 |

*Rate of change at 100° C./200° C. for PA66 and PA6, rate of change at 50° C./100° C. for PP and NBR

TABLE 4

| | | Mw | Mw/Mn | Alkali-soluble portion (mass %) | Degree of crystallinity (%) | Specific surface area ($m^2/g$) | DS |
|---|---|---|---|---|---|---|---|
| Example 2-1 | Chemically modified fine fibers 2-1 | 380,000 | 4.7 | 3.6 | 75 | 36 | 0.82 |
| Example 2-2 | Chemically modified fine fibers 2-2 | 410,000 | 3.2 | 7.1 | 71 | 46 | 0.78 |
| Example 2-3 | Chemically modified fine fibers 2-3 | 190,000 | 2.4 | 6.5 | 65 | 42 | 0.95 |
| Example 2-4 | Chemically modified fine fibers 2-4 | 340,000 | 5.4 | 3.4 | 75 | 22 | 0.90 |
| Example 2-5 | Chemically modified fine fibers 2-5 | 320,000 | 2.5 | 10.5 | 80 | 38 | 0.87 |
| Example 2-6 | Chemically modified fine fibers 2-6 | 160,000 | 2.0 | 8.3 | 64 | 39 | 0.97 |
| Comp. Example 2-1 | Chemically modified fine fibers 2-7 | 270,000 | 6.4 | 18.7 | 68 | 49 | 1.03 |
| Comp. Example 2-2 | Chemically modified fine fibers 2-8 | 600,000 | 8.7 | 12.5 | 62 | 44 | 0.95 |
| Comp. Example 2-3 | Chemically modified fine fibers 2-9 | 140,000 | 1.8 | 12.2 | 61 | 44 | 1.10 |
| Comp. Example 2-4 | Chemically modified fine fibers 2-10 | 160,000 | 4.2 | 4.1 | 56 | 50 | 1.30 |
| Comp. Example 2-5 | Chemically modified fine fibers 2-11 | 280,000 | 2.2 | 12.1 | 77 | 56 | 0.95 |
| Comp. Example 2-6 | Non-chemically-modified fine fibers 2-1 | 240,000 | 8.6 | 10 | 82 | 27 | 0 |

TABLE 4-continued

| | CV (%) | Td (° C.) | 1% Weight reduction Temperature (° C.) | 250° C. weight Rate of change (%) | ΔYI | Sheet strength |
|---|---|---|---|---|---|---|
| Example 2-1 | 19 | 290 | 309 | −1.6 | 22 | Good |
| Example 2-2 | 17 | 273 | 282 | −2.7 | 29 | Good |
| Example 2-3 | 22 | 290 | 309 | −1.2 | 18 | Good |
| Example 2-4 | 29 | 289 | 308 | −1.1 | 21 | Acceptable |
| Example 2-5 | 24 | 289 | 307 | −1.2 | 36 | Acceptable |
| Example 2-6 | 25 | 290 | 308 | −1.1 | 27 | Acceptable |
| Comp. Example 2-1 | 19 | 258 | 273 | −7.1 | 42 | Poor |
| Comp. Example 2-2 | 26 | 253 | 266 | −3.3 | 34 | Poor |
| Comp. Example 2-3 | 31 | 289 | 307 | −1.1 | 39 | Poor |
| Comp. Example 2-4 | 19 | 266 | 276 | −4.8 | 47 | Poor |
| Comp. Example 2-5 | 27 | 290 | 309 | −1.0 | 47 | Acceptable |
| Comp. Example 2-6 | — | 225 | 243 | −16.5 | 65 | Poor |

TABLE 5

| | | Resin | | Cellulose | | Additive | | Cellulose whiskers | | Storage | | |
|---|---|---|---|---|---|---|---|---|---|---|---|---|
| | Sample | Name | Parts by mass | Name | Parts by mass | Name | Parts by mass | Name | Parts by mass | modulus change* | Outer appearance | CTE ppm/K |
| Example 2-7 | Resin composite 2-1 | PA66 | 98 | Chemically modified fine fibers 2-1 | 2 | | | | | 7.0 | Good | 76 |
| Example 2-8 | Resin composite 2-2 | PA66 | 90 | Chemically modified fine fibers 2-1 | 10 | | | | | 4.0 | Good | 30 |
| Example 2-9 | Resin composite 2-3 | PA6 | 90 | Chemically modified fine fibers 2-1 | 10 | | | | | 4.5 | Good | 37 |
| Example 2-10 | Resin composite 2-4 | PP | 96 | Chemically modified fine fibers 2-1 | 4 | | | | | 7.4 | Good | 68 |
| Example 2-11 | Resin composite 2-5 | PA6 | 90 | Chemically modified fine fibers 2-1 | 7 | RCW-20 | 3 | | | 4.3 | Good | 33 |
| Example 2-12 | Resin composite 2-6 | PA6 | 88 | Chemically modified fine fibers 2-1 | 7 | RCW-20 | 3 | SC900 | 2 | 4.6 | Good | 35 |
| Comp. Example 2-7 | Resin composite 2-7 | PA6 | 90 | Fine fibers 2-1 | 10 | | | | | 5.3 | Poor | 50 |
| Comp. Example 2-8 | Resin composite 2-8 | PA6 | 90 | Chemically modified fine fibers 2-7 | 10 | | | | | 4.2 | Poor | 33 |

*Change at 0° C./150° C. for PA66 and PA6, change at −50° C./100° C. for PP

Based on the evaluation results for Example I, using chemically modified fine fibers with a high thermal decomposition initiation temperature was found to yield a resin composite with high heat resistance and excellent outer appearance of the resin composite and excellent mechanical properties (storage modulus, CTE, flexural modulus and flexural strength). Using chemically modified fine fibers with a low thermal decomposition initiation temperature, on the other hand, had a high level of discoloration and could not yield a resin composite satisfying all of the physical properties, including outer appearance and mechanical properties.

Based on the evaluation results for Example II, using chemically modified fine fibers with a high Mw, low Mw/Mn, low alkali-soluble portion and high degree of crystallinity yielded a resin composite with high heat resistance, and excellent outer appearance of the resin composite, storage modulus and CTE.

Both Examples I and II demonstrated that using resins with high melting points resulted in more excellent outer appearance and resin composites with excellent mechanical properties.

INDUSTRIAL APPLICABILITY

The resin composite of the invention can be suitably used as a resin composite with high heat resistance that is desirable for on-vehicle use, by using chemically modified fine fibers with a high thermal decomposition initiation temperature.

The invention claimed is:

1. A resin composite containing 0.5 to 40 mass % of fine cellulose fibers, a resin, and a dispersion stabilizer, wherein:
the fine cellulose fibers have:
- a thermal decomposition initiation temperature (TD) of 270° C. or higher,
- a 1% weight reduction temperature ($T_{1\%}$) of 289° C. or higher,
- a number-average fiber diameter of 10 nm or greater and less than 1 μm,
- a degree of crystallinity of 60% or higher,
- an alkali-soluble portion content of 12 mass % or lower, and
- an average content of an acid-insoluble component of less than 10 mass %;

the resin is a thermoplastic resin having a melting point; and
the dispersion stabilizer is a polyoxyethylene-based surfactant with a polyoxyethylene chain as a hydrophilic group.

2. The resin composite according to claim 1, wherein the fine cellulose fibers are dispersed in a resin composite in the form of a dispersion comprising a dispersion stabilizer and the fine cellulose fibers dispersed in the dispersion stabilizer, and the content of the fine cellulose fibers in the dispersion is 10 to 99 mass %.

3. The resin composite according to claim 1, wherein the dispersion stabilizer is at least one selected from the group consisting of surfactants and organic compounds with a boiling point of 160° C. or higher.

4. The resin composite according to claim 1, wherein the resin is at least one selected from the group consisting of polyolefin-based resins and polyamide-based resins.

5. A resin composite according to claim 1, wherein the melting point of the resin is 220° C. or higher.

6. The resin composite according to claim 1, wherein the linear coefficient of thermal expansion (CTE) of the resin composite is 80 ppm/k or smaller.

7. The resin composite according to claim 1, wherein the weight-average molecular weight (Mw) of the fine cellulose fibers is 100,000 or greater, and the ratio (Mw/Mn) of the weight-average molecular weight (Mw) and number-average molecular weight (Mn) is 6 or lower.

8. The resin composite according to claim 1, wherein the number-average fiber diameter of the fine cellulose fibers is 50 nm to 300 nm.

9. The resin composite according to claim 1, wherein the average content of the acid-insoluble component per unit specific surface area of the fine cellulose fibers is 1.0 mass %·g/m$^2$ or lower.

10. A member for an automobile, comprising a resin composite according to claim 1.

11. A member for an electronic product, comprising a resin composite according to claim 1.

12. The resin composite according to claim 1, wherein a 250° C. weight reduction of the fine cellulose fibers is −2.7% or more.

13. The resin composite according to claim 1, wherein the polyoxyethylene chain length is three or greater.

14. The resin composite according to claim 1, wherein the polyoxyethylene chain length is five or greater.

15. The resin composite according to claim 1, wherein the polyoxyethylene chain length is ten or greater.

16. The resin composite according to claim 1, wherein the polyoxyethylene chain length is fifteen or greater.

17. The resin composite according to claim 1, wherein the polyoxyethylene-based surfactant is polyoxyethylene hardened castor oil ether.

* * * * *